US012644587B1

(12) United States Patent
Henrici et al.

(10) Patent No.: US 12,644,587 B1
(45) Date of Patent: Jun. 2, 2026

(54) CONNECTION ELEMENT

(71) Applicant: BJB GmbH & Co. KG, Arnsberg (DE)

(72) Inventors: Philipp Henrici, Arnsberg (DE); Olaf Baumeister, Sundern (DE); Mark Weber, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 19/055,042

(22) Filed: Feb. 17, 2025

(30) Foreign Application Priority Data

Feb. 19, 2024 (DE) ..................... 10 2024 104 511.6

(51) Int. Cl.

| | |
|---|---|
| ***F21V 23/06*** | (2006.01) |
| ***F21V 17/20*** | (2006.01) |
| ***F21V 19/00*** | (2006.01) |
| ***F21V 23/00*** | (2015.01) |
| ***F21V 29/70*** | (2015.01) |
| ***F21Y 115/10*** | (2016.01) |

(52) U.S. Cl.

CPC .............. *F21V 23/06* (2013.01); *F21V 17/20* (2013.01); *F21V 19/0035* (2013.01); *F21V 19/004* (2013.01); *F21V 19/0055* (2013.01); *F21V 23/005* (2013.01); *F21V 29/70* (2015.01); *F21Y 2115/10* (2016.08)

(58) Field of Classification Search

CPC ........ F21V 23/06; F21V 23/005; F21V 29/70; F21V 17/20; F21V 19/0035; F21V 19/04; F21Y 2115/10

USPC ..................................................... 362/249.02

See application file for complete search history.

(56) References Cited

U.S. PATENT DOCUMENTS

| | | | | |
|---|---|---|---|---|
| 9,146,027 B2 * | 9/2015 | Zantout | F21V 17/005 | |
| 9,239,152 B2 * | 1/2016 | Ho | F21V 19/0055 | |
| 2012/0051068 A1 * | 3/2012 | Pelton | F21V 23/06 | 362/373 |
| 2012/0218760 A1 * | 8/2012 | Nagaoka | F21V 3/062 | 362/249.02 |

FOREIGN PATENT DOCUMENTS

| | | |
|---|---|---|
| DE | 102008005823 A1 | 8/2009 |
| DE | 202009012000 U1 | 12/2010 |
| DE | 102017101809 A1 | 8/2018 |
| DE | 202023105716 U1 | 10/2023 |
| EP | 2818733 A1 | 12/2014 |

* cited by examiner

*Primary Examiner* — Laura K Tso

(74) *Attorney, Agent, or Firm* — Smartpat PLC

(57) ABSTRACT

A connection element electrically connects an LED on a PCB. A substantially ring-shaped frame mechanically holds the PCB on a heat sink. A contact arrangement is mounted in the frame and supplies electricity to the LED. The frame is divided into a first, outer, ring and a second, inner, ring. The first ring surrounds the PCB and holds it parallel to the heat sink. The second ring is seated coaxially in the outer ring and is overlaid on the PCB at least in some areas to hold the PCB vertical to the heat sink. The connection element has a fastening part. The fastening part is seated in a receptacle in the outer ring. The inner ring has a counter-bearing for the fastening part. The fastening part engages in the counter-bearing substantially parallel to the arrangement surface of the heat sink and fixes the inner ring in the outer ring.

20 Claims, 14 Drawing Sheets

CONNECTION ELEMENT

CROSS-REFERENCE TO RELATED APPLICATION

This application claims the benefit of German Patent Application No. DE 10 2024 104 511.6, 19 Feb. 2024, the content of which is incorporated in its entirety.

BACKGROUND

The invention relates to a connection element for the electrical connection of an LED light source, wherein the LED light source has a circuit board which is provided with contact fields for the electrical supply of the LED, and with a substantially ring-shaped frame, which is intended to be overlaid on the circuit board and to mechanically hold it on an arrangement surface of a heat sink, and with a contact arrangement, which is mounted in the frame, and serves to supply electricity to the LED.

A generic connection element is known from the applicant's German patent DE 10 2008 005 823 A1. In the latter, a ring element is overlaid on the circuit board and holds it between itself and a counter-bearing, in particular a heat sink. The ring element is configured in such a way that it has a housing for contact elements. The contact elements are brought into contact with the contact fields of the LED board. A connection conductor is inserted into the housing from outside and held in a clamping section. At the same time, the ring element has receptacles for fastening elements, for example screw bolts, so that it can be fastened on the heat sink. The ring-shaped frame of this connection element therefore not only ensures secure and solder-free electrical contact with the LED, but also at the same time fastens it on the heat sink.

LED technology has since developed rapidly. COBs with a large number of different LED chips on a carrier board are now usually used. They have a low installation depth and are manufactured in a wide range of luminosity, size and shape. However, the object still remains to make a secure electrical contact with the LED board and at the same time hold it securely on the heat sink.

DE 20 2023 105 716 U1 belonging to the applicant shows a further development of a generic connection element in which said ring element is divided into two and consists of a first ring as the outer ring and a second ring as the inner ring. The outer ring takes on the task of holding the LED circuit board laterally on the heat sink, whilst the inner ring is inserted concentrically into the outer ring, partially overlaid on the LED circuit board and thus fixing it.

This not only facilitates the assembly of a lighting unit, but also the pre-assembly, the stocking of partially assembled units consisting of a heat sink and first ring, and also the subsequent replacement of LED boards.

At the same time, the market demands that the connection elements be as flat as possible, since if they are applied too thickly, the LEDs can be partially overshadowed. This reduces the light output, but above all also the preset beam angle. The flatter the design, the closer to the LED a reflector can also be seated. Nevertheless, the board must still be installed securely. It should still be seated exactly in its installation position in order to be able to guarantee its full performance. It should be held securely, but it should still be possible to replace it easily when installed.

SUMMARY

It is an object of the disclosure to provide further secure fastening options for an LED board in a connection element of the abovementioned type, which take the abovementioned challenges into account.

The object is solved by a connection element having features as claimed, in particular a connection element in which the frame is divided into a first ring and a second ring, the first ring, as the outer ring, is intended to surround the circuit board and to hold it in a direction parallel to the arrangement surface of the heat sink, the second ring, as the inner ring, is seated coaxially in the outer ring, is overlaid on the circuit board at least in some areas, and is intended to hold the circuit board in a direction vertical to the arrangement surface of the heat sink, in which the connection element has a fastening part, the fastening part is seated in a receptacle in the outer ring, the inner ring has a counter-bearing for the fastening part, and the fastening part engages in the counter-bearing substantially parallel to the arrangement surface of the heat sink in a radial direction and fixes the inner ring in the outer ring, wherein the fastening part comprises a swivel lug which fixes the inner ring in the outer ring.

The fastening part exerts a substantially radial force on the inner ring and is supported here on the outer ring. Overall, the outer ring, fastening part and inner ring interact to fix each other in a plane that is parallel to the circuit board or parallel to the arrangement plane or the surface of the heat sink. This is particularly advantageous because, in this way, neither the inner ring nor the fastening part are higher than the outer ring overall. This is of considerable importance in COB technology because the light output is improved if the connection elements are designed to be flat.

It is advantageous if the connection element has two swivel lugs which are arranged diametrically opposite one another and fix the inner ring in the outer ring. The two fastening elements exert their substantially radially acting forces against one another and thus hold the inner ring securely between them.

A preferred embodiment provides that the fastening part comprises a swivel lug which fixes the inner ring in the outer ring. This embodiment also specifies that the fastening part, here the swivel lug, engages in a counter-bearing parallel to the arrangement surface of the heat sink.

The fastening principle of this embodiment is based on a swivel plate that is seated in the outer ring. The swivel axis around which the swivel plate can rotate is oriented vertically and thus parallel to the installation direction. The swivel plate comprises an elongated section, the swivel lug, which can be rotated out of the outer ring from its rest position in the outer ring to fasten the inner ring. This section can be wedge-shaped or tongue-shaped, for example.

The swivel lug engages in a counter-bearing on the inner ring of the connection element, the latter being formed as a radial holding projection or holding lug on which the swivel lug is overlaid to fix the inner ring. Preferably, the holding projection protrudes beyond the otherwise circular contour of the inner ring here and offers a surface which is aligned parallel to the swivel plane and engages over the swivel lug with its underside.

The positive connection between the surface of the holding projection and the underside of the swivel lug leads to the fastening of the inner ring on the outer ring by the swivel lug. It is also conceivable for the swivel lug to engage in a counter-bearing which is closed on the light exit side, for example a groove in the outer circumference of the inner ring.

In this embodiment, the outer ring of the connection element preferably forms a housing for the swivel lug, in which the swivel lug is seated by means of a pin which is vertical to the arrangement surface and around the longitudinal axis of which it can be pivoted out of the housing onto the holding projection. The housing is open towards the inner ring here in order to allow the swivel lug to emerge.

It is particularly advantageous if the swivel lug has a receptacle profile for an unlocking tool. With the unlocking tool, the swivel lug can be released from the friction surface pairing and swiveled back into the housing in the outer ring. The inner ring is then free and can be released from the outer ring, for example to replace the circuit board.

In addition, the outer ring can form a contour cutout in the area of the swivel lug for inserting the associated holding projections. The contour cutout preferably corresponds exactly to the outer contour of the inner ring in the area of the holding projections.

A further preferred embodiment provides for the connection element in which the frame is divided into a first ring and a second ring, the first ring, as the outer ring, is intended to surround the circuit board and to hold it in a direction parallel to the arrangement surface of the heat sink, the second ring, as the inner ring, is seated coaxially in the outer ring, is overlaid on the circuit board at least in some areas, and is intended to hold the circuit board in a direction vertical to the arrangement surface of the heat sink, in which the connection element has a fastening part, the fastening part is seated in a receptacle in the outer ring, the inner ring has a counter-bearing for the fastening part, and the fastening part engages in the counter-bearing substantially parallel to the arrangement surface of the heat sink in a radial direction and fixes the inner ring in the outer ring, wherein the fastening part is a spring clip with a holding leg against which the outer wall of the inner ring rests and having two spring arms extending from the holding leg in opposite circumferential directions, which engage around the inner ring and fix it in the outer ring.

The connection element preferably has two spring clips which are arranged diametrically opposite one another and fix the inner ring in the outer ring.

The spring clip is designed here in such a way that the outer wall of the inner ring rests directly against the spring clip in a contact area of the holding leg. The spring arms extending from the holding leg engage around the outer wall of the inner ring and hold the inner ring in the outer ring with spring force.

Each spring arm preferably has a holding lug at its free end pointing towards the inner ring. The inner ring is provided with wall cutouts here and each holding lug engages over a holding surface in the wall cutout so that an additional holding force acting in the direction of the arrangement surface is exerted on the inner ring.

Each clip spring therefore has a total of two holding lugs, both of which act on the inner ring aligned parallel to one another. On the one hand, they transfer the radial force of the clip spring to the inner ring and, on the other hand, they also have a vertical fixing effect on the inner ring in the installation direction. The circuit board positioned in its insertion contour is thus held securely in its position between the inner and outer rings.

In a preferred embodiment, the spring arms each have, at their free end, a support section which is at right angles to the holding leg. The support sections of a spring clip are seated on the base of the outer ring and engage around the two corresponding holding projections of the inner ring.

As a leaf spring of small size and material thickness, the spring clip is subject to strong forces in the connection element. It can therefore tend to twist, for example, when the inner ring is inserted. Twisting can be avoided if the spring arms are able to rest laterally on the base of the outer ring by means of the support sections. At the same time, they offer additional stability if they engage around the inserted inner ring from the outside at the holding projections and hold it between them.

It is particularly advantageous in this embodiment if the receptacle for the spring clip is designed in the form of a trough in the base of the outer ring. By forming an indentation in a part of the outer ring as a trough or receptacle, the spring clip is seated particularly securely in the outer ring.

The support sections are then seated on the bottom of the trough and hold the spring clip in position.

In addition, the overall height of the spring clip can be maximized. This allows, for example, the use of wide spring arms which exert an even better holding force compared to the inner ring.

Furthermore, in this embodiment it is conceivable for tolerances in the overall height of the inner ring or spring clip to be better compensated since clearance is provided in the installation direction here.

It is also advantageous if the spring clip forms a body extension starting from the contact area, the surface of which serves as a support for an arrangement means with which the connection element can be fastened on the heat sink. The body extension has here an opening which is arranged congruently with a bore in the outer ring to guide the arrangement means through.

The body extension preferably extends opposite the spring arms to the outer edge of the outer ring. The outer ring is preferably cut out accordingly at this point and forms an indentation here for the insertion of the body extension. Since the spring clip is preferably made of metal, the body extension forms a robust support for an arrangement means, such as a screw, with which the connection element is fixed to the heat sink. A metal surface as a support for the screw head offers great advantages over plastic here, since metal can withstand pressure better and is also more likely to allow deformations. The indentation is selected so that the tightened screw head does not protrude beyond the top of the outer ring.

Another particular advantage is that the outer ring and the spring clip can be pre-assembled together on the heat sink. The spring clip is then fastened on the outer ring in the area of the body extension so that the LED board and inner ring can be inserted in a second assembly step.

A third embodiment provides that the fastening part comprises a spring-loaded locking element which fixes the inner ring in the outer ring. The guidance of force is particularly advantageous here. The holding force of the fastening part acts radially and thus parallel to the arrangement plane on the heat sink. The connection element can be reduced accordingly in terms of the overall height, and the fastening element does not add bulk.

According to a preferred embodiment, the outer ring forms the receptacle for the spring-loaded locking element in the form of a housing that is open towards the inner ring and in which the locking element is seated so as to be radially moveable. The arrangement of the housing in the ring collar of the outer ring offers the possibility of the locking element covering the maximum possible distance towards the inner ring when it is supported on the outer wall of the outer ring. The spring travel in the connection element is thus maximized and the spring can exert its maximum force on the locking element.

The locking element comprises a bolt and a compression spring, wherein the compression spring is seated in the housing and presses the bolt in a radial direction towards the inner ring. If the spring of the locking element can be supported on the inner outer wall of the outer ring, then the spring travel in the connection element is maximized and the spring can exert its maximum force on the locking element.

As a locking counter-bearing, the inner ring forms a locking wedge which interacts with the clamping element, the lower wedge surface serving as the engagement surface. The locking wedge points with its wedge tip towards the outer ring or towards the locking bolt. When the inner ring is inserted into the outer ring, the lower wedge surface of the locking wedge, which points in the installation direction, first comes into contact with the top of the bolt. The inclined surface of the underside of the wedge guides the bolt back into the housing against the spring tension so that the inner ring can slide into its installation position.

The upper wedge surface of the locking wedge preferably serves as a locking surface which interacts with a catch surface on the underside of the bolt and fixes the inner ring in the outer ring. The catch surface and the locking surface form a frictional connection here. If two locking units diametrically opposite one another act against each other, they hold the inner ring particularly securely between them.

It is advantageous here if the locking surface and the catch surface form a pair of inclined surfaces that directs the radially acting forces of the compression spring towards the arrangement surface.

Overall, any spring element can be used in this embodiment that allows the bolt to be pressed in a radial direction towards the inner ring parallel to the arrangement surface of the heat sink. For example, this compression spring of the tensioning element can be a helical spring or a leaf spring.

BRIEF DESCRIPTION OF THE DRAWINGS

Further advantages of the invention and a better understanding thereof are to be found in the following description of several exemplary embodiments. In the figures.

DETAILED DESCRIPTION

Figure 13:
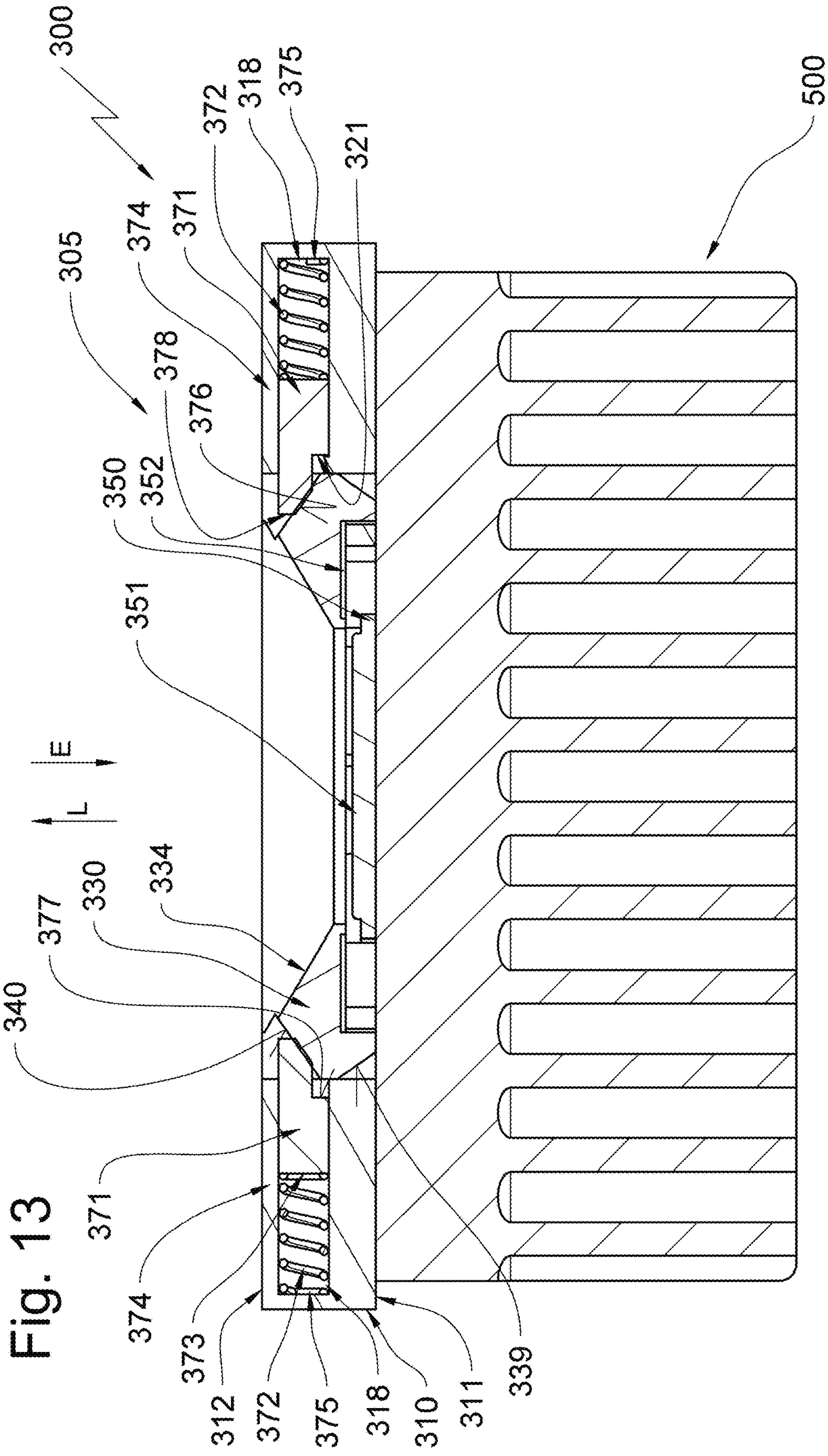
FIG. 13 shows a sectional view along the section line A-A shown in FIG. 12 of the second embodiment according to FIG. 10 in an assembled state.
Figure 14:
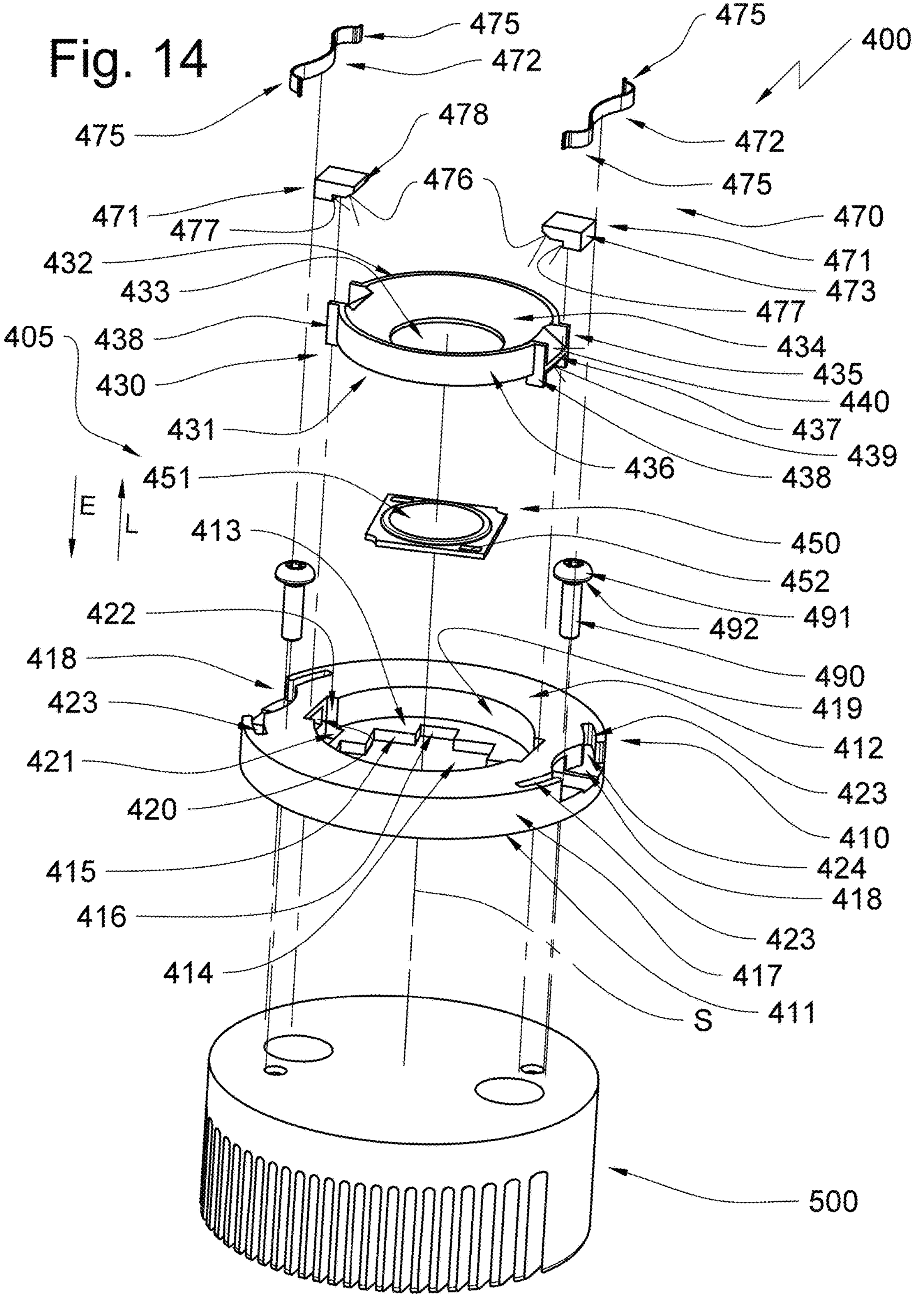
FIG. 14 shows a variant of the third embodiment of the connection element with the locking element, here mounted on a leaf spring.

An embodiment of the connection element as a whole is given reference numeral 100 in FIGS. 1 to 5. A further embodiment of the connection element is shown in FIGS. 6 to 9. It is identified overall by reference numeral 200. A third embodiment of the connection element is presented in FIGS. 10 to 13. This is identified overall by reference numeral 300. The variant of the third embodiment presented in FIG. 14 is identified overall by reference numeral 400 in FIG. 14.

In all of the figures, the installation direction E is defined as being vertical in the direction of the arrangement plane A on the surface of the heat sink 500 and the light exit direction L as being vertically away from arrangement plane A.

The arrangement plane A as the surface of a heat sink 500 on which all embodiments of the connection element can be mounted is valid for all embodiments, but is only shown as an example in FIGS. 10 to 14.

Also applicable in all of the figures is the fact that a system axis S runs through the centre point of the arrangement of the outer and inner rings 110/130, 210/230, 310/330, 410/430 in the light exit direction L.

Figure 1:
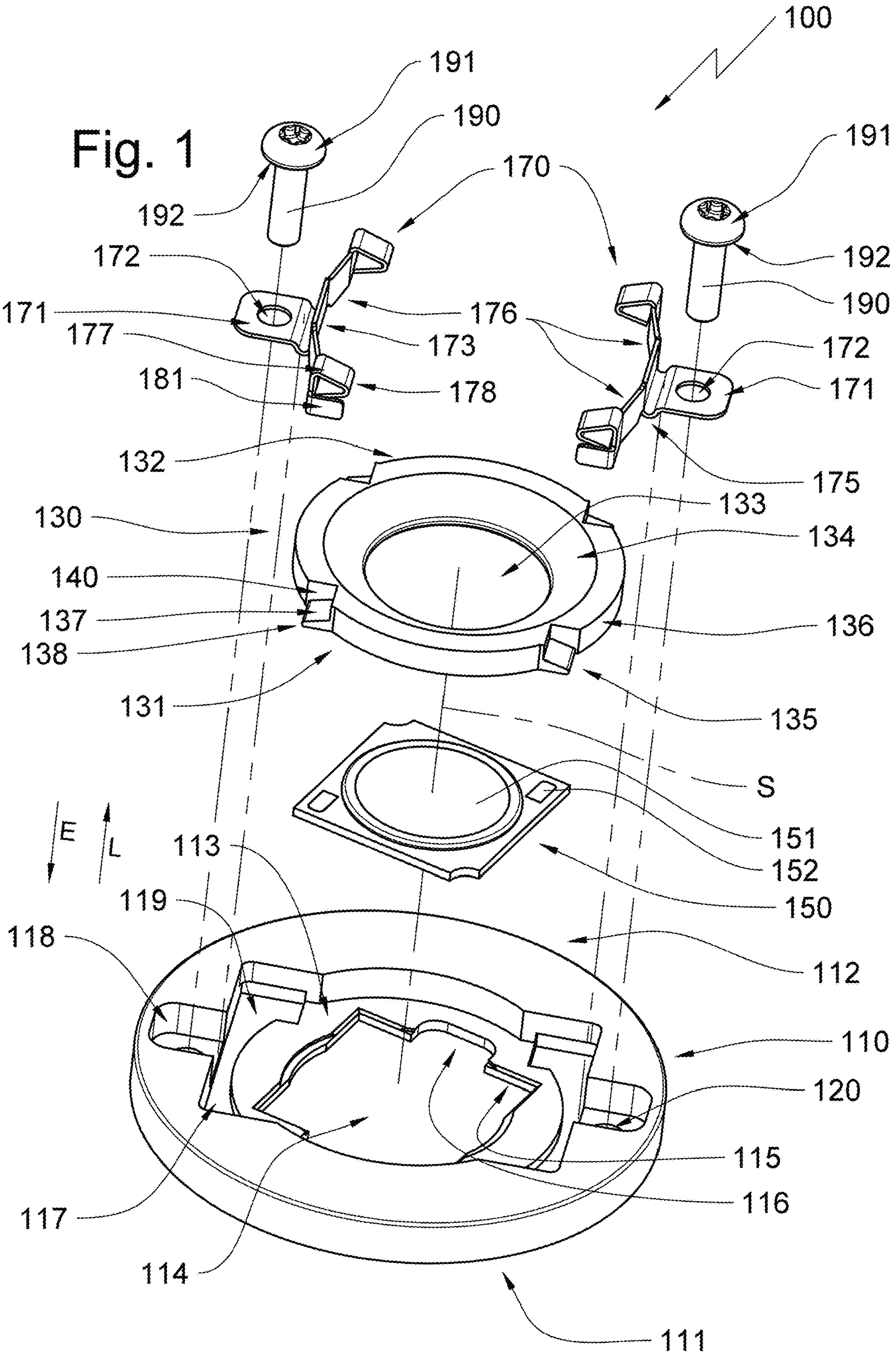
FIG. 1 shows an embodiment of a connection element with a spring clip in an exploded view.

FIG. 1 shows an embodiment with a connection element identified overall by reference numeral 100 in an exploded view. The connection element 100 comprises a substantially ring-shaped frame 105 which consists of a first ring 110 and a second ring 130. The first ring is also referred to as the outer ring 110, the second ring as the inner ring 130.

The outer ring 110 and the inner ring 130 hold an LED board or circuit board 150 with an LED 151 and the corresponding contact fields 152 for an electrical connection between them.

The ring-shaped frame 105 of the connection element 100 accommodates contact elements (not shown in more detail) which interact with the contact fields 152 and enable electrical contact to be made with the LED 151.

The connection element 100 further comprises two fastening parts in the form of two spring clips 170 which fix the inner ring 130 in the outer ring 110. The connection element 100 or the outer ring 110 is fastened on the arrangement surface of a heat sink 500 (not shown) by means of the screw bolts 190 so that the circuit board 150 with the LED 151 is held between the connection element 100 and the heat sink 500.

For the arrangement plane A of a connection element 100 on a heat sink 500, reference is made to FIGS. 10 to 14 in which the heat sink 500 which can also be used for this embodiment 100 is shown accordingly.

Of course, it is also conceivable for the connection element 100 to be fastened on the arrangement plane of any other counter-bearing instead of the heat sink 500.

The outer ring 110 has a bottom side 111 and a top side 112. The bottom side 111 is placed on the surface of the heat sink 500 for assembly in the installation direction E. The top side 112 points in the light exit direction L.

The outer ring 110 initially has a cutout 114 on its base plate 113. The cutout 114 is cut in such a way that it can be divided into a substantially square insertion contour 115 and further engagement contours 116. These merge into one another. The insertion contour 115 serves to accommodate the circuit board 150. The engagement contours 116 enable the circuit board 150 to be removed from its installation position without causing any damage.

The base plate 113 also has two opposite trough-like indentations 117. Each of these indentations 117 has a substantially arch-like contour. The indentation 117 is supplemented by a cutout 118 in the outer ring 110. The cutout 118 and the indentation 117 merge into one another and form a receptacle trough 119. The spring clip 170 is inserted into this receptacle trough 119 during assembly.

The spring clip 170 consists of a punched metal sheet with various extensions, each of which fulfils its own function. Firstly, the spring clip has a body extension 171 which serves as a fastening base and has a bore 172 which is used to pass through an arrangement means, here the screw bolt 190.

The bore hole opening 172 is advantageously congruent with a bore 120 in the cutout 118 of the outer ring 110 here. The screw bolt 190 can be guided through both openings 172, 120 at the same time. The outer ring 110 and the spring clip 170 can therefore be fastened simultaneously on the arrangement plane A, the surface of the heat sink 500. This simplifies pre-assembly. This partially assembled assembly consisting of the heat sink 500, outer ring 110 and fastening part 170 can also be stored in this way.

The body extension or the fastening base 171 is aligned parallel to the arrangement plane A or to the base plate 113. A holding leg 173 is arranged on this fastening base 171. The punched metal sheet of the spring clip 170 is accordingly bent at this point by 90° in the light exit direction L. The holding leg 173 is therefore vertical to the arrangement plane A and forms the contact surface 174 against which the outer wall 136 of the inner ring 130 rests during assembly.

The metal sheet is not simply bent at a right angle in the transition area between the fastening base 171 and the holding leg 173, but forms a spring arch 175 at the bending angle. On the one hand, this results in there being sufficient distance between the bore hole 172 and the holding leg 173 for the support of a screw bolt head 191, and, on the other hand, the spring arch 175 enables an additional radial spring force of the holding leg 173 in the direction of the outer wall 136 of the inner ring 130.

Starting from the holding leg 173, a spring arm 176 extends in both directions at the circumferential height of the inner ring 130. Each spring arm 176 is deflected radially in the direction of the inner ring 130. The spring arms 176 spring around an axis that runs vertically through the holding leg 173 parallel to the installation direction E. They exert a spring force acting parallel to the arrangement plane A on the outer wall 136 of the inner ring 130. Since, in each connection element 100 according to this embodiment, two spring clips 170 are located diametrically opposite one other, the spring forces of the spring arms 176 always act against one other and thus clamp the inner ring 130 between them in the outer ring 110.

At their free end, the spring arms 176 each have a holding lug 177. The holding lug 177 is overlaid on the inner ring 130, which will be described here first.

The inner ring 130 also has a bottom side 131 and a top side 132. The bottom side 131 of the inner ring 130 is oriented in the installation direction E to the base plate 113 of the outer ring 110 and is overlaid on the circuit board 150.

Both the outer and inner rings 110/130 can contain openings or housings for receiving contact elements which serve to electrically contact the LED 151, but are not shown in more detail here.

The inner ring 130 has a ring-shaped opening 133 in its centre, the size of which corresponds approximately to the outer circumference of the LED 151, so the base of the inserted LED 151 ends at the edge of the opening 133. From its top side 132, the inner wall 134 of the inner ring 130 runs in a funnel shape towards the ring-shaped opening 133. The funnel shape helps maintain the optimal beam angle of the LED 151.

Wall cutouts 135 are located at four opposite locations. Distributed over the outer circumference of the inner ring 130, the outer wall 136 is cut out four times in an approximately cube-shaped manner. The intended cube shape is not completely symmetrical—the bottom of the wall cutouts 135 in the inner ring 130 is cut out in a slightly ramp-shaped manner here—and the cutout 135 becomes deeper towards the outside.

In this way, four holding ramps 137 are formed. The ramp tip 138—the flattest part of the ramp—is directed in the direction of the outer ring 110 here, more precisely in the direction of the spring arms 176 of the spring clip 170.

The holding lug 177, formed from a bent extension of the spring arm 176, is overlaid on the holding ramp 137 in the assembled state. The tip 178 of the holding lug 177 exerts a compressive force in the direction of the opposite tip 178 of the opposite holding lug 177 here.

The bottom side 179 of the holding lug 177 rests on the surface 139 of the holding ramp 137. An additional pressure force oriented vertically to the arrangement plane A is thus exerted on the inserted inner ring 130, which additionally holds the inner ring 130 in the outer ring 110 in the assembled state.

Furthermore, the lateral inner surfaces 180 of the holding lugs 177 can rest against the vertical cutout walls 140 of the wall cutouts 135. An additional holding force can again also be exerted on the section of the inner ring 130 located between the wall cutouts 135 here.

The wall cutouts 135 as a whole serve as a counter-bearing for the spring clip 170 here.

Figure 2:
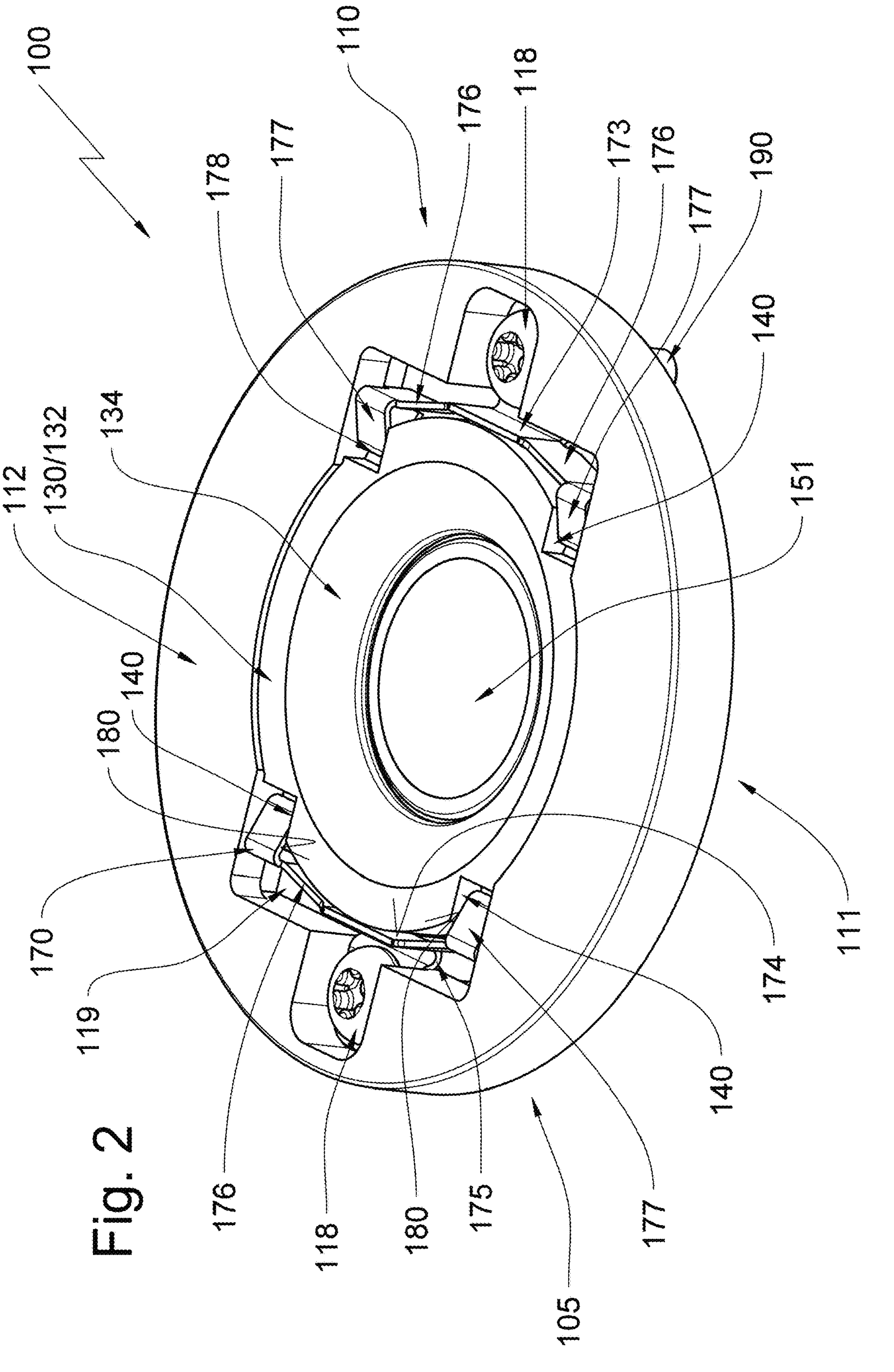
FIG. 2 shows a perspective view of the embodiment shown in FIG. 1 in an assembled state.

FIG. 2 shows the embodiment of the connection element 100 in the assembled state in a perspective view from above. The components outer ring 110 and inner ring 130 previously described in their individual parts in FIG. 1 are assembled here, hold the circuit board 150 between them and an arrangement surface A of a heat sink 500 (not shown), with the spring clip 170 fastening the inner ring 130 in the outer ring 110 and holding it securely.

For assembly in the installation direction E, the inner ring 130 is placed from above on the outer ring 110, which is already pre-assembled on the arrangement plane A of the heat sink 500 and which also already carries the spring clips 170. These are advantageously fastened using the same screw bolts 190 that are also used for assembly on the heat sink 500.

The inner ring 130 is placed from above in installation direction E onto the holding lugs 177 of the spring clips 170 and clipped in by exerting manual pressure in the installation direction E without any additional tools. The holding lugs 177 spring back here and, guided by the spring force, slide over the holding ramps 137 back into their fastening position.

In the installed state, it is clear that the spring clip 170 is seated in the receptacle trough 119 formed by the indentation 117 and the cutout 118 and does not protrude compared to the overall height of the outer ring 110.

The body extension 171 of the spring clip 170 forms, with its fastening base 171 aligned parallel to the arrangement plane A, a stable counter-bearing for the bottom side 192 of a screw bolt head 191. In comparison to the surfaces 112, 132 of the connection element 100, which are otherwise made of plastic, the metal support is shatter-proof and, if applicable, flexible, so that the connection element 100 can be securely and firmly fastened on the surface of the heat sink 500 with the screw bolt 190.

At the same time, the body extension 171 with the curved transition in the form of a spring arch 175 offers a stable hold for the holding leg 173. This is mounted on the body extension 171 in a slightly springy manner via the spring arch 175 and can thus successfully support the inner ring 130, while the spring arms 176 engage around the outer wall 136 of the inner ring 130 and hold it between the holding lugs 177 arranged at the free ends.

Figure 3:
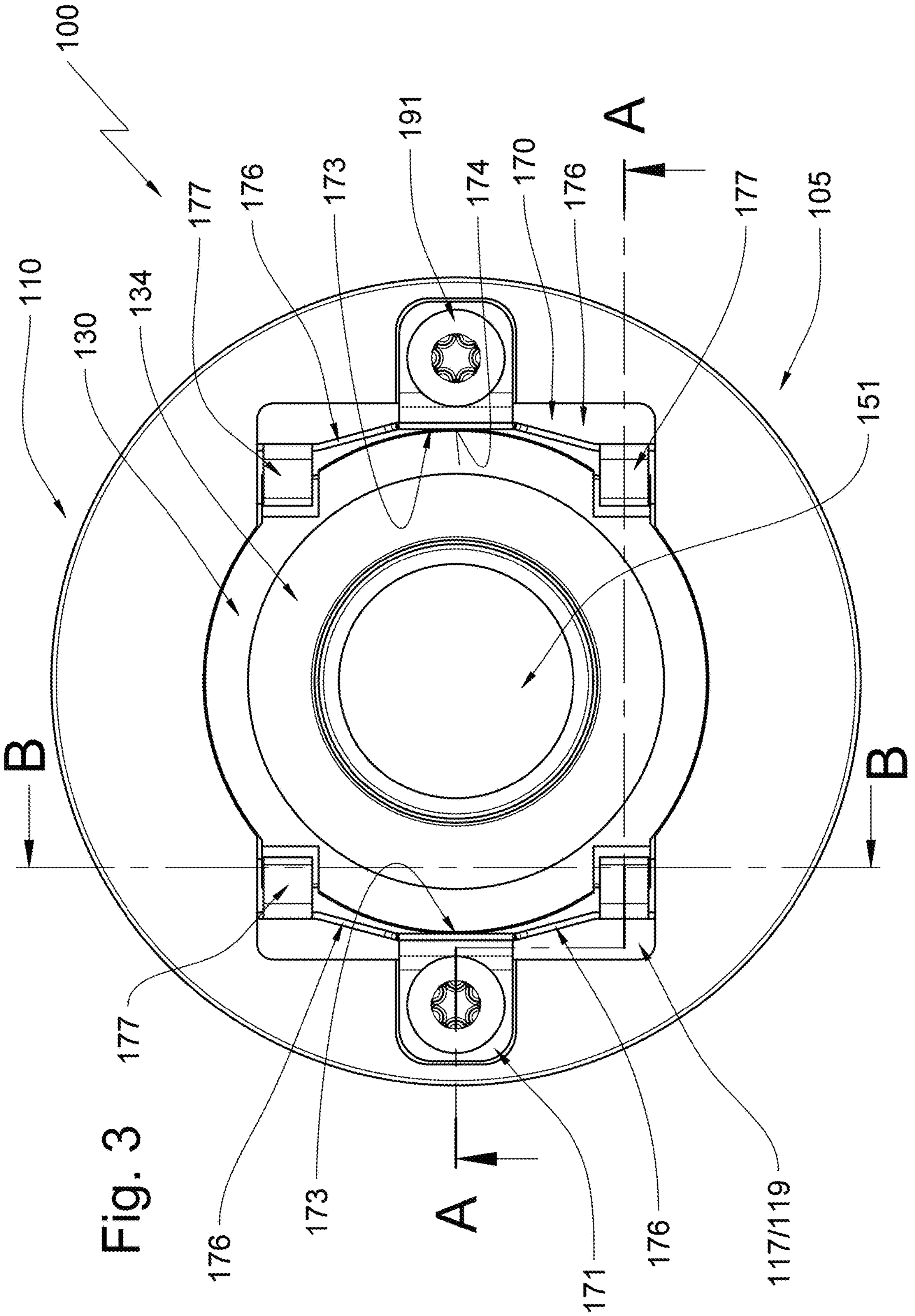
FIG. 3 shows a view of the embodiment shown in FIG. 1 in an assembled state from above.

FIG. 3 shows the connection element of the embodiment 100 in a plan view from above. The shape of the spring clip 170, which serves as a fastening element between the outer ring 110 and the inner ring 130, is clearly visible. First of all, visible on both sides is the body extension 171 of the two spring clips 170 on whose metal surface the screw head 191 of the screw bolt 190 is seated. It can be seen from above that the spring arch 175 offers the screw head 191 sufficient distance from the holding leg 173. The holding leg 173 rests with its inner side on the outer wall 136 of the inner ring 130.

From there, the spring clip 170 forks into two spring arms 176 which engage around the inner ring 130. The holding lugs 177, which are overlaid on the cube-shaped cutouts 135 in the inner ring 130, are located at the free ends of the spring arms 176. At the very outside, the spring arms 176 also form support sections 181, which support the spring clip 170 in the bottom of the receptacle trough 119 of the outer ring 110 when the inner ring 130 is inserted.

It is also clear that the two opposing spring clips 170 hold the inner ring 130 between them and that the holding forces for fastening the inner ring 130 in the outer ring 110 run substantially parallel to the arrangement plane A of the heat sink 500.

Figure 4:
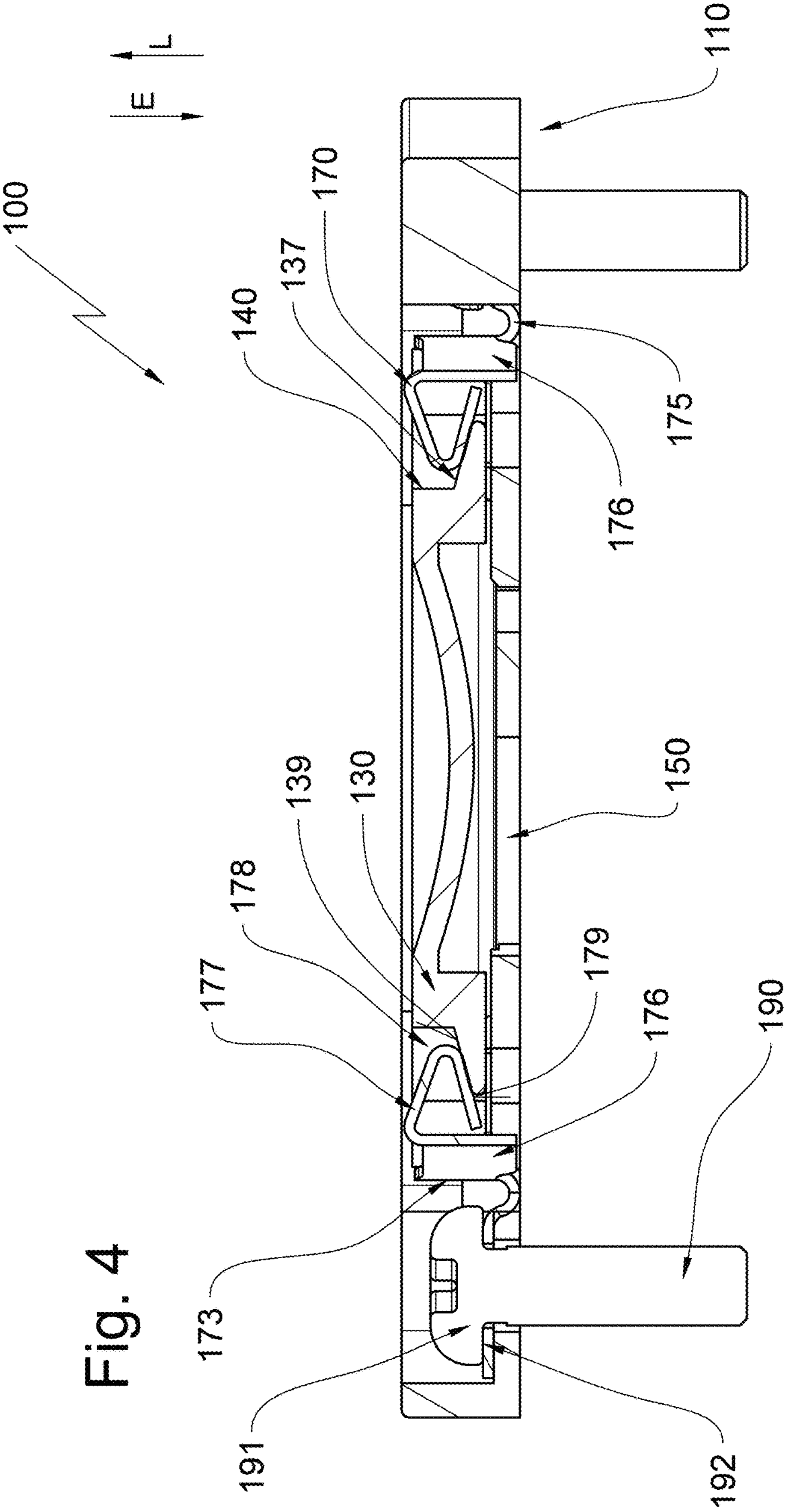
FIG. 4 shows a sectional view along the section line A-A shown in FIG. 3 according to FIG. 1 in an assembled state.

FIG. 4 shows a sectional view along a section line A-A shown in FIG. 3. As in FIGS. 2 and 3, the inner ring 130 is also already fastened in the outer ring 110 here. The support of the screw heads 191 on the body extensions 171 is clearly visible in the cutout 118 on the left-hand side. The section shows that the LED 151 rests on its circuit board 150 in the cutout 114 of the bottom side 111 of the first ring 110 and rests in a plane on the surface and arrangement plane A of the heat sink 500. The inner ring 130 is seated in the outer ring 110 and holds the circuit board 150 firmly underneath it. For final fixing, there are spring clips 170 with their locking lugs 177 or holding lugs which fix the inner ring 130 at opposite points.

Figure 5:
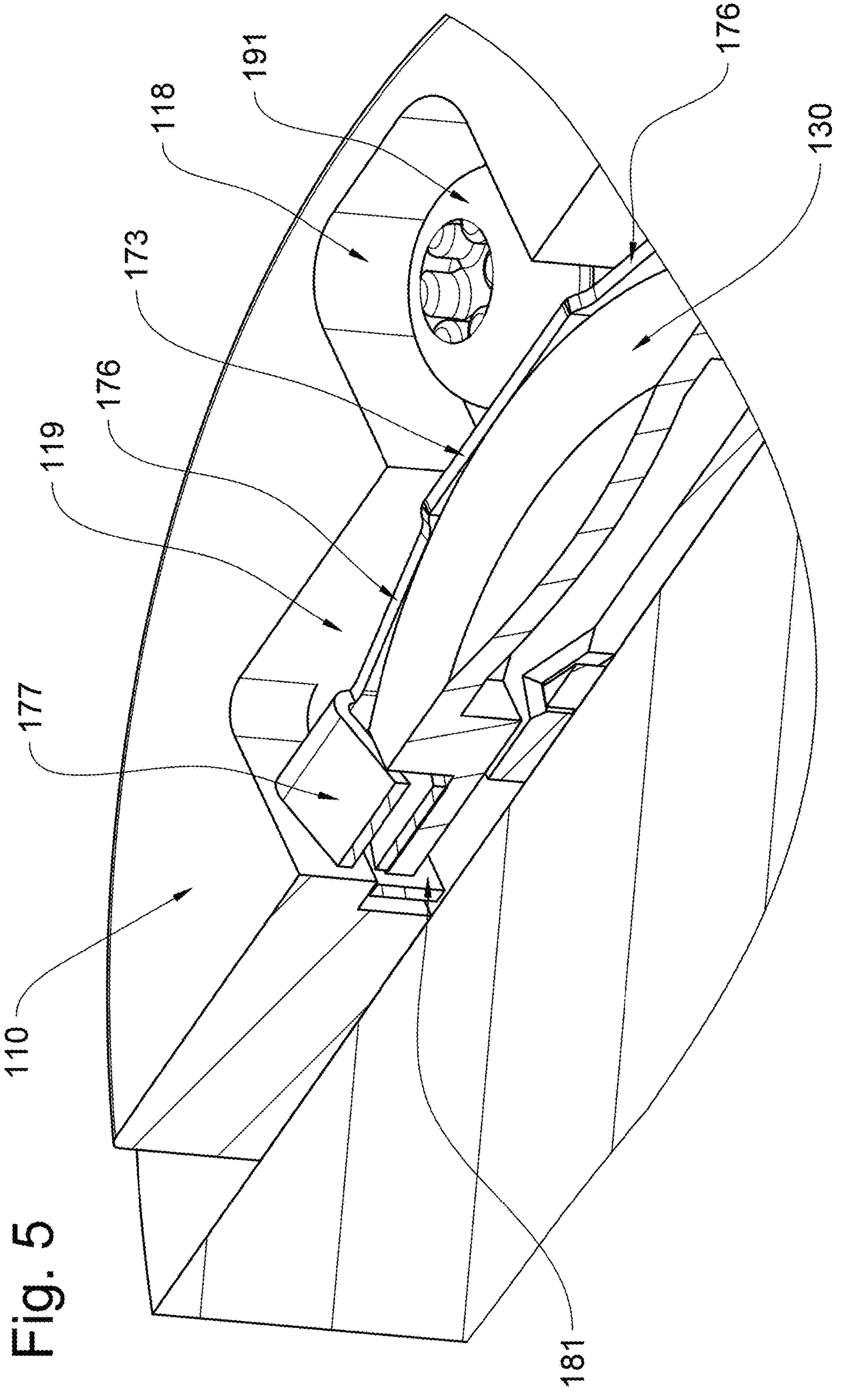
FIG. 5 shows a partial section along the section line B-B marked in FIG. 3, here in particular the support element of the spring clip.

The clever structure of the spring clip 170 is once again clearly visible in the section shown in FIG. 5. This sectional view shows not only the fastening of the spring clip 170 in the outer ring 110 via the body extension 171, holding legs 173 and spring arms 176, but also the support of the holding lug 177 on the holding ramp 137 of the inner ring 130 and the lateral support of the spring clip 170 by the support sections 181 bent at right angles towards the inner ring 130.

The support sections 181 not only offer the spring clip 170 more stability—especially when inserting the inner ring 130—but in addition also engage around the adjacent holding ramps 137 from the outside and thus represent an additional fastening factor.

Figure 6:
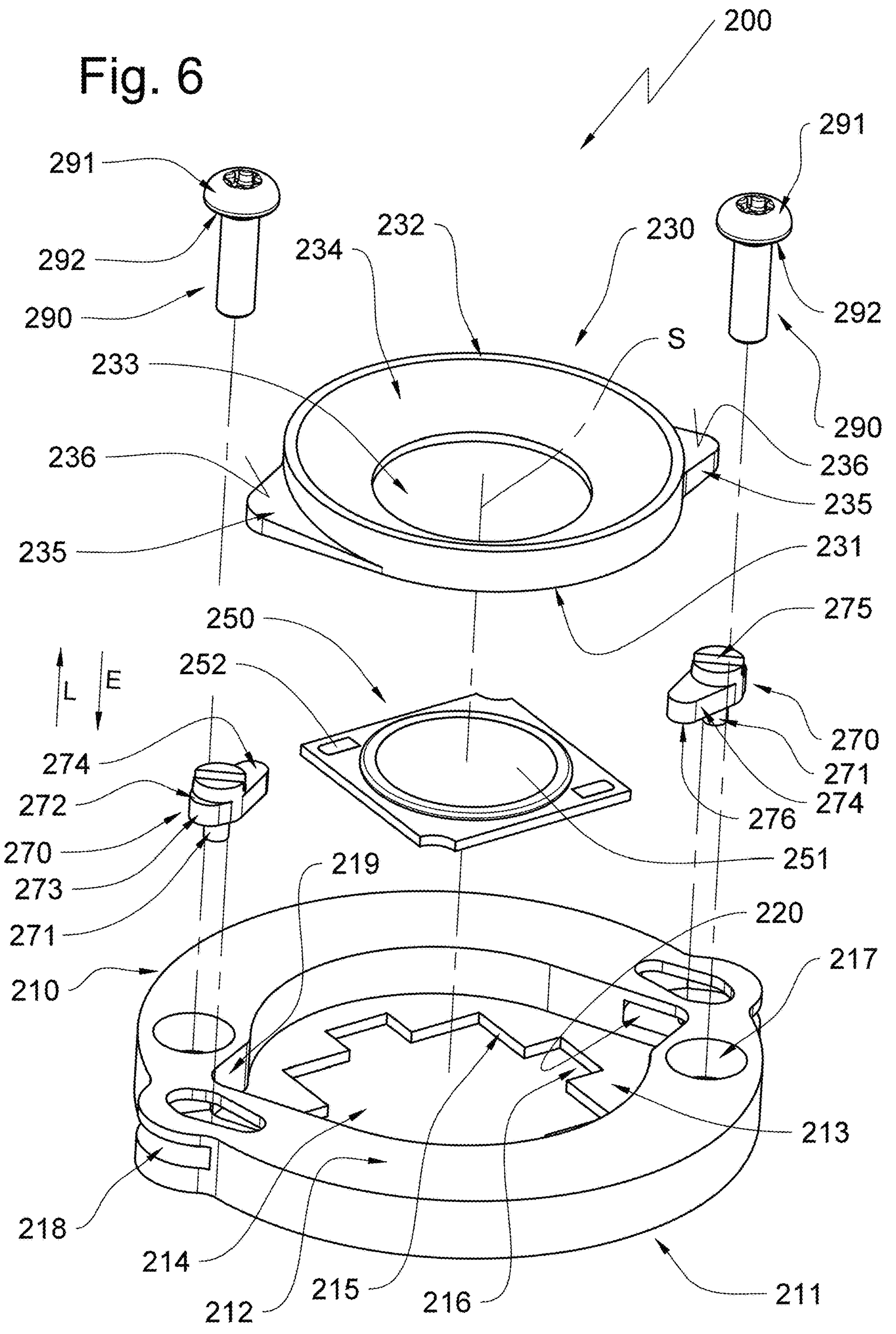
FIG. 6 shows a further embodiment of the connection element with the swivel lug as a fastening part in an exploded view.

FIG. 6 shows a further embodiment 200 in an exploded view. In this embodiment 200 too, the arrangement of the connection element 200 comprises a substantially ring-shaped frame 205 which consists of a first ring 210 and a second ring 230, as well as an LED circuit board 250 and a pair of fastening elements 270 which serve to fasten the inner ring 230 in the outer ring 210 and thus secure the inserted circuit board 250.

The outer ring 210 consists of a substantially circular frame 205 with a bottom side 211 with which it is placed and fastened on the top side or arrangement surface of a heat sink 500. For this purpose, the outer ring 210 has two opposing bores 217 through which arrangement elements 290, such as screw bolts here, are guided in the installation direction E and are fixed in the heat sink 500. The bores 217 are advantageously provided in this embodiment such that the bore hole on the top side 212 of the outer ring 230 is dimensioned such that the screw head 291 of the screw bolt 290 can be countersunk. It therefore does not protrude from the surface of the connection element 200.

The outer ring 210 also has a top side 212 pointing in the light exit direction L. A base plate 213 can be seen inside the outer ring 210, which is provided with a cutout 214. This cutout 214 is intended for receiving the LED board 250 and is only shown schematically. Such a cutout 214 is basically adapted to the dimensions of the LED board 250 and comprises here an insertion contour 215 (shown only schematically) and an engagement contour 216, which makes it possible to place the LED board 250 into the receptacle without causing any damage or to remove it from its receptacle in the bottom 213 of the outer ring 210.

The outer ring 210 also has two opposing housings 218 which serve to receive the fastening elements 270. The otherwise substantially circular contour of the outer ring 210 is expanded on the outside in this area. This contour expansion 219 enables the intended movement path of the fastening element 270 without it pivoting out of the outer ring 210.

The outer ring 210 is also open on its top side 212 in the area of the housing 218 to allow the insertion of the fastening element 270 in the installation direction E.

The housing 218 is also provided with an opening 220 to the interior of the outer ring 210. The fastening element 270 pivots out of this opening 220 in order to fix the inner ring 230.

The inner ring 230 also has a bottom side 231 and a top side 232. The bottom side 131 is oriented in the installation direction E to the base plate 213 of the outer ring 210 and is overlaid on the circuit board 250 here.

Both the outer and inner rings 210/230 can contain openings or housings for receiving contact elements (not shown in more detail here).

The inner ring 230 has a ring-shaped opening 233, the size of which corresponds approximately to the outer circumference of the LED 251, so the base of the inserted LED 251 ends at the edge of the opening 233. From its top side 232, the inner wall 234 of the inner ring 230 runs in a funnel shape towards the ring-shaped opening 233. The funnel shape helps maintain the optimal beam angle of the LED 251.

The outer contour of the inner ring 230 is predominantly ring-shaped, the inner ring 230 being widened outwards at two opposite points. Here the inner ring 230 forms holding projections or holding lugs 235. The holding projection 235 is a projection with an approximately bell-shaped contour on the lower edge of the inner ring 230 pointing in the direction of the arrangement surface A, the overall height of which is only approximately a quarter of the outer wall height of the inner ring 230. This projection, also referred to as a holding lug 235, extends in the direction of the outer ring 210.

The outer ring 210 is accordingly cut out at the corresponding points in its inner circumferential contour to allow seamless insertion of the inner ring 230. After insertion, the holding lugs 235 lie on the bottom 213 of the outer ring 210 in a plane with the bottom side 231 of the inner ring 230. The housings 218 in the outer ring 230 are also arranged in the area of these cutouts and this is where the fastening parts 270 are located.

The eccentric-like fastening parts 270 are also shown in the exploded view in FIG. 6. They initially comprise a pin 271 which can be inserted in the installation direction E into a corresponding recess 221 in the housing 218. The fastening part 270 can be pivoted about the longitudinal axis running through the pin 271. The fastening part 270 has a swivel plate 272 which has a shorter guide section 273 and a longer fastening section 274, which is also referred to here as a swivel lug 274 or swivel wedge.

The outer contour of the swivel plate 272 is oval in this embodiment, but other contours are also conceivable. The oval contour is advantageous because it can only be inserted into the housing 218 in a certain position and can no longer slip laterally after the inner ring 230 has been inserted and locked.

On its top side pointing in the light exit direction L, the fastening part 270 has a receptacle profile 275 into which an unlocking tool can engage. A simple slotted profile 275 is shown, for example for a screwdriver. Other profiles are also conceivable.

The unlocking tool makes it easy to carry out the pivoting movement of the swivel lug 274 in a horizontal direction, parallel to the arrangement plane A. The swivel lug 274, which still points in the circumferential direction of the outer ring 210 after the fastening part 270 has been inserted into the housing 218 in the outer ring 210, is rotated out of the housing 218 in the direction of the inner ring 230. It then is overlaid on the inner ring 230 in the area of the holding lugs 235 and secures it in its installation position in the outer ring 210.

Figure 7:
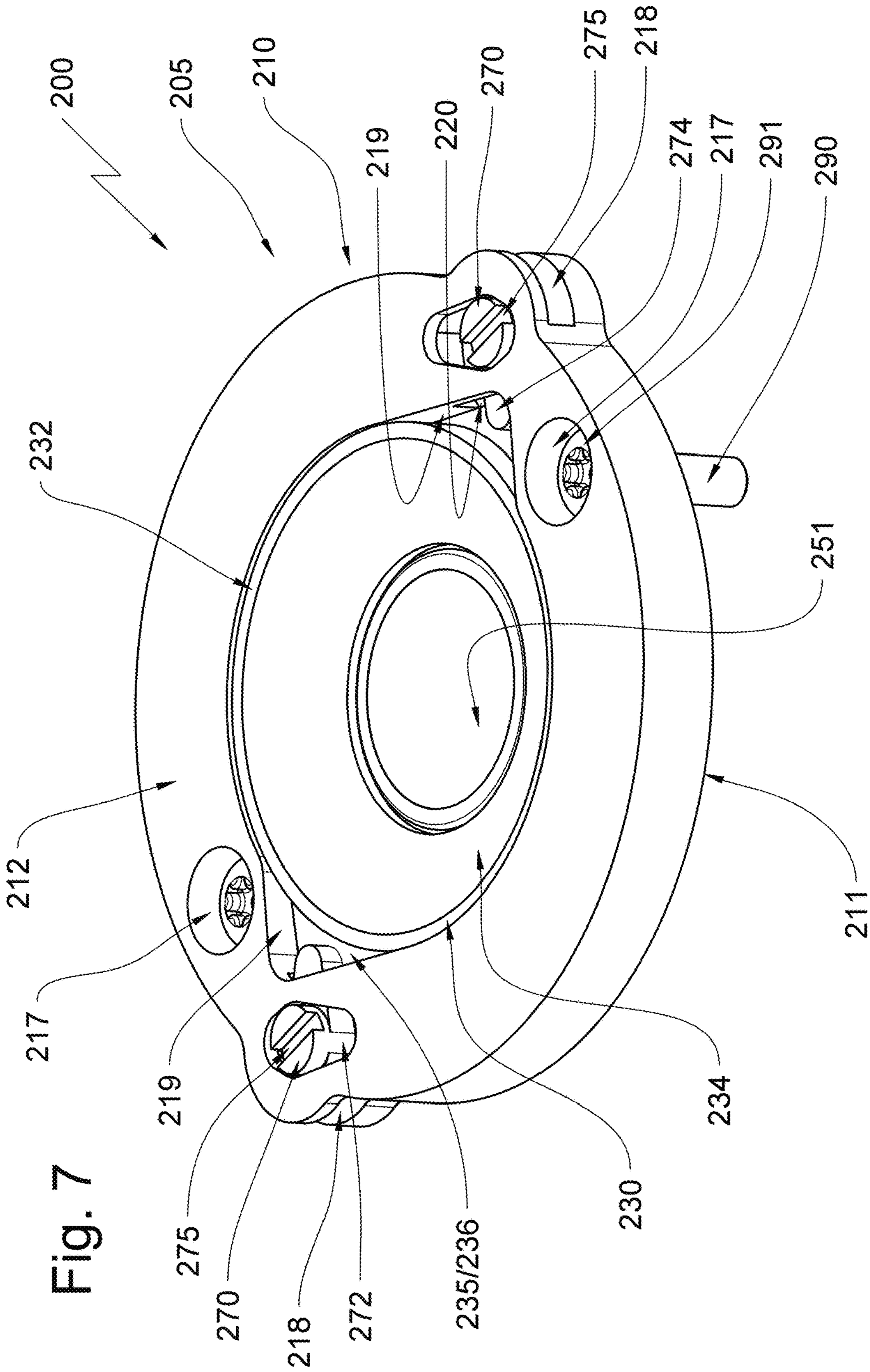
FIG. 7 shows a perspective view of the embodiment shown in FIG. 6 in an assembled state.

FIG. 7 shows the embodiment of the connection element in assembled form. In perspective, it can be seen that the inner ring 230 is seated in the outer ring 210 and overlaid on the circuit board 250. The LED 251 is seated in the opening 233 of the inner ring 230 and can optimally emit its light via the funnel-shaped inner wall 234. The connection element 200 is fastened on the arrangement surface A of a heat sink 500 with two screws 290 which pass through the ring collar of the outer ring 210 on opposite sides. The heat sink 500 is not shown at this point. The two fastening elements 270, which are also arranged opposite one another, are seated in their respective housings 218, and the swivel lug 274 has already been pivoted out of the opening 220 and is laid over the respective holding projection 235 of the inner ring 230.

Figure 8:
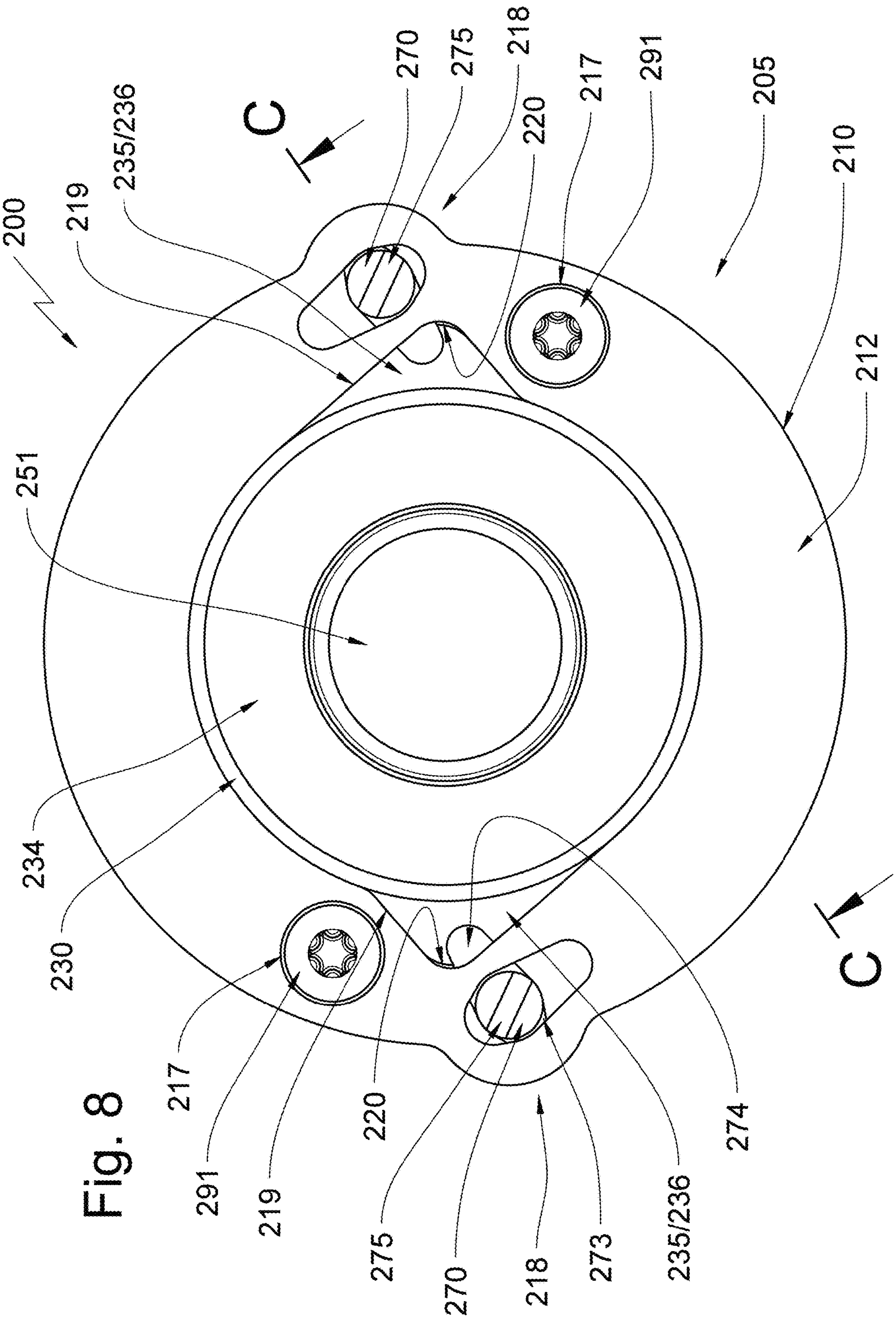
FIG. 8 shows a view of the embodiment shown in FIG. 6 in an assembled state from above.

FIG. 8 shows the embodiment of the connection element in plan view. The contour cutouts 219 on the inner circumference of the outer ring 210 are clearly visible once again here. It can also clearly be seen that the outer contour of the outer ring 210 in the area of the housing 218 also deviates from the normal circular contour and protrudes slightly outwards. The shape of the housing is selected so that the fastening element 270 can be rotated from its rest position into the fastening position within the housing 218 without it protruding outwards beyond the outer ring 210.

Figure 9:
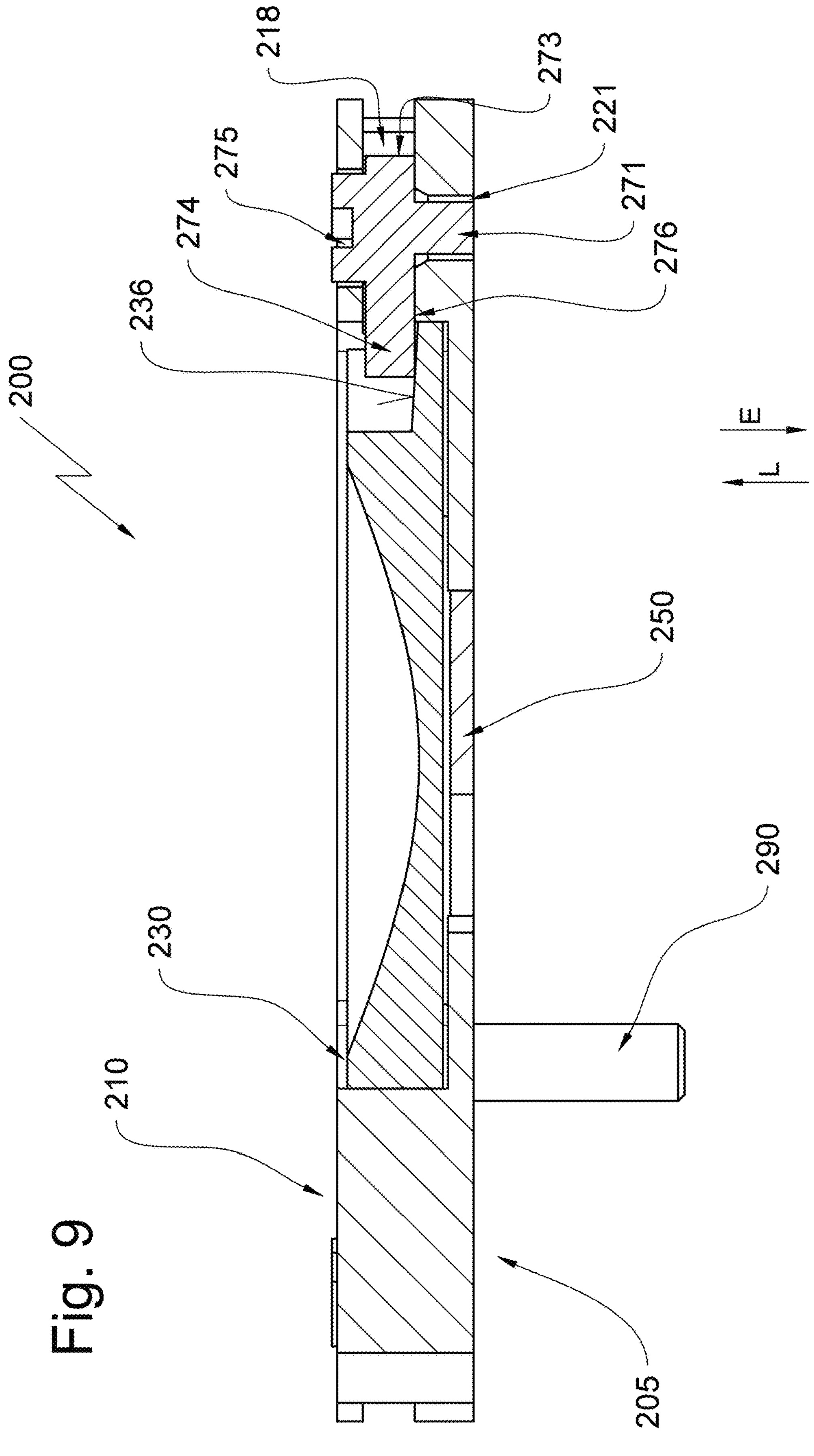
FIG. 9 shows a sectional view along the section line A-A shown in FIG. 8 according to FIG. 6 in an assembled state.

FIG. 9 shows the fastening position in a sectional view along the section line A-A shown in FIG. 8. The fastening element 270 is seated in its housing 218. The pivot pin 271 is rotatably seated in its recess 221. The swivel lug 274 has already been swivelled into the fastening position and is overlaid on the holding lug 235. A surface pairing is created between the bottom side of the swivel lug 276 pointing in the installation direction E and the surface of the holding projection 235 of the inner ring 230 pointing in the light exit direction L. The inner ring 230 is therefore securely fixed in the outer ring 210. The inner ring 230 is overlaid on the circuit board 250 and secures it firmly in its position in the connection element 200. The pressure force of the swivel lugs 276 is transferred to the circuit board 250. Using a suitable unlocking tool, the fastening part 270 can be rotated back from its fastening position to the rest position again so that the inner ring 230 is released and can be removed from the outer ring 210.

Figure 10:
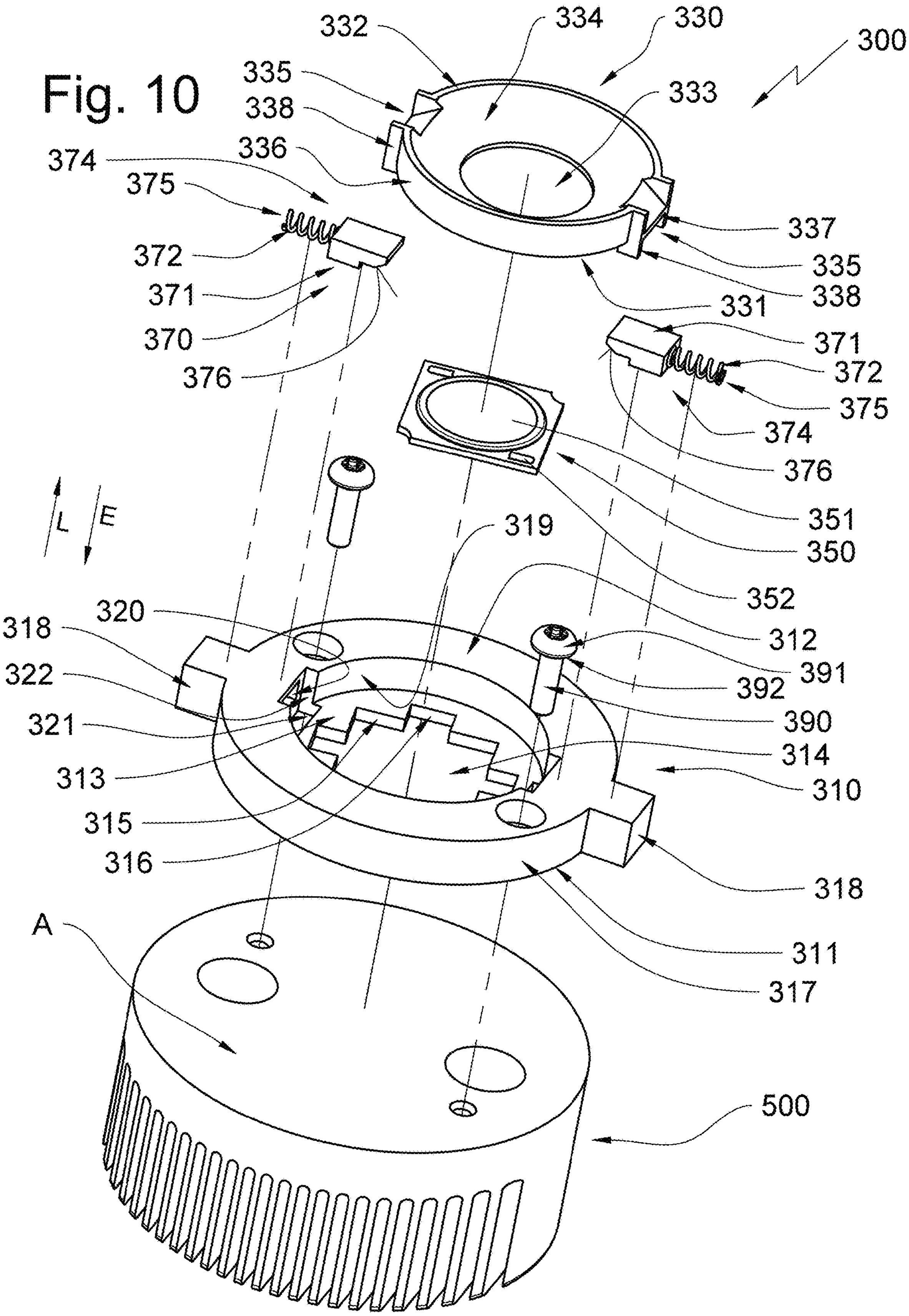
FIG. 10 shows a third embodiment of the connection element with the locking element.

FIG. 10 provides an overview of the third embodiment of the connection element in which a spring-loaded locking element 370 serves for fastening. The arrangement 300 consists, as in the other embodiments 100, 200, of a substantially ring-shaped frame 305, which consists of an outer ring 310 and an inner ring 330, a circuit board 350 and a pair of fastening elements 370, which serve to fasten the inner ring 330 in the outer ring 310 and therefore fix the inserted circuit board 350.

Figure 11:
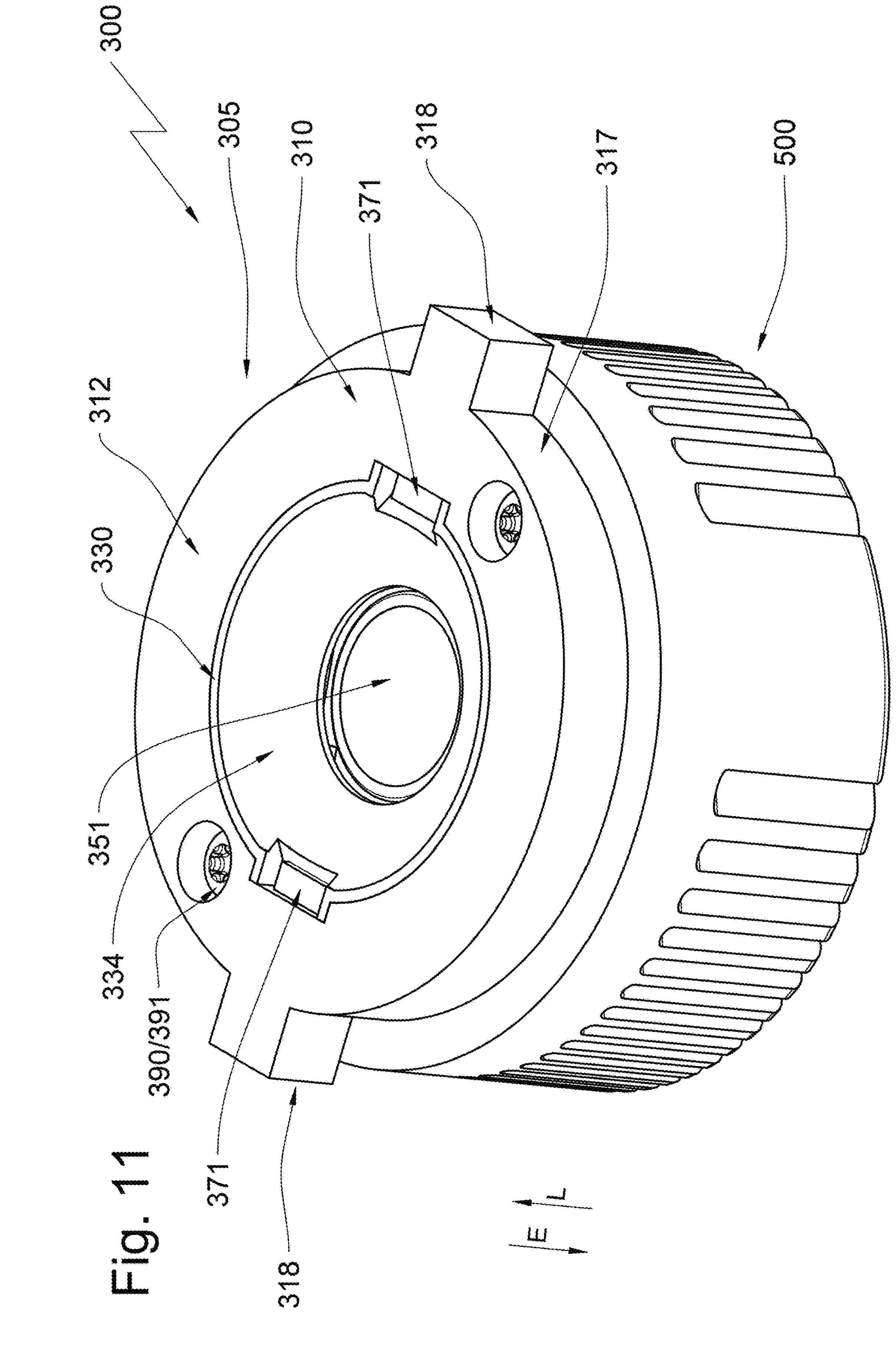
FIG. 11 shows a perspective view of the embodiment shown in FIG. 10 in an assembled state.
Figure 12:
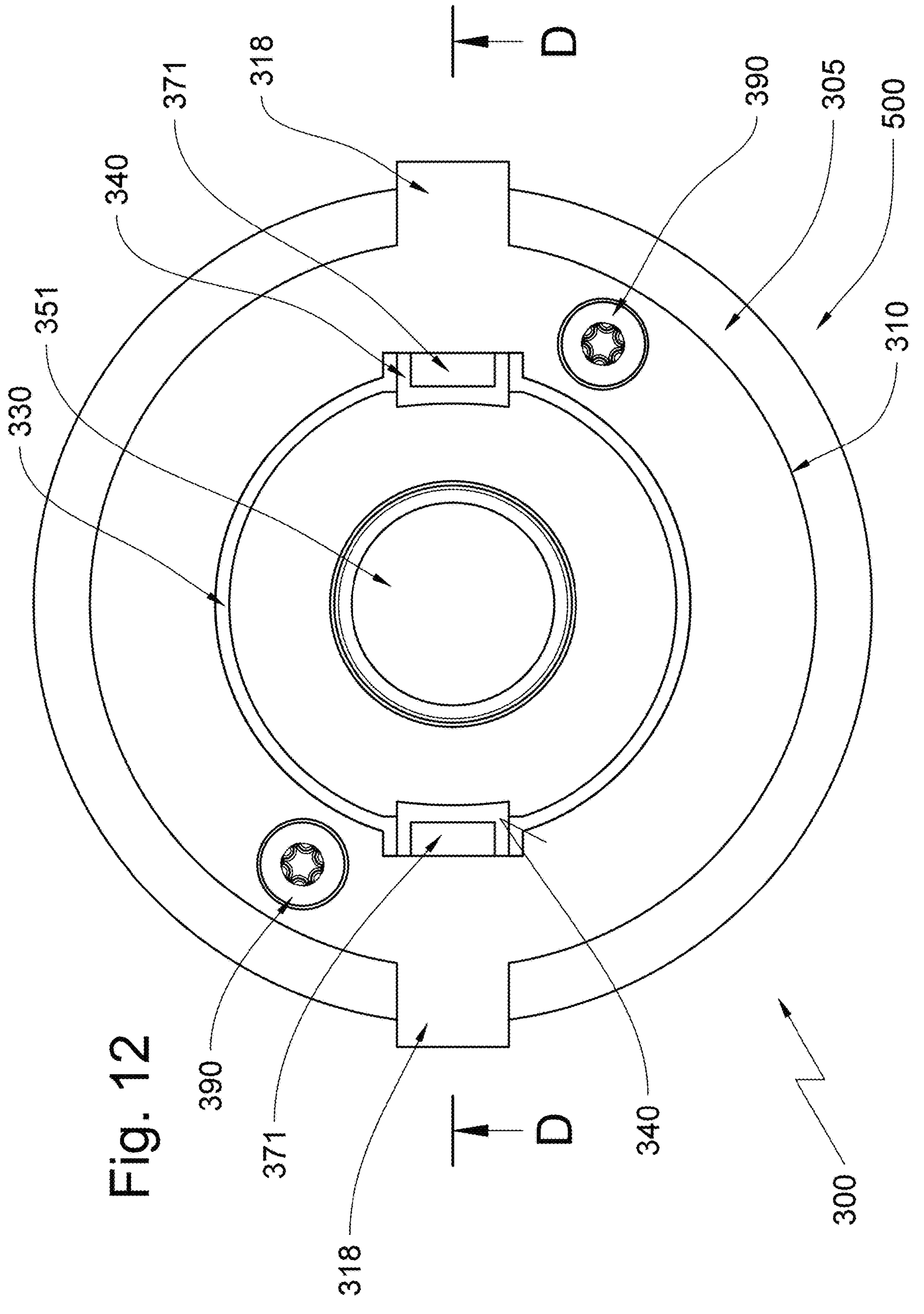
FIG. 12 shows a view of the embodiment shown in FIG. 10 in an assembled state from above.

The outer ring 310 consists of a substantially circular frame, also referred to as a ring collar, with a bottom side 311 with which it is placed and fastened on the top side or arrangement surface A of a heat sink 500. In this regard, reference is also made to the sectional view in FIG. 13 and the perspective view in FIG. 11. The outer ring 310 has bores in the installation direction E for screw bolts or other equivalent arrangement elements 390. However, for this embodiment, it is also intended that the arrangement elements, such as screw bolts 390, for example, are countersunk in the outer ring 310 in such a way that they do not protrude from the top side 312 of the connection element 300. FIG. 11 illustrates this in a perspective view.

The outer ring 310 also has a top side 312 pointing in the light exit direction L. As in the other two embodiments, the base plate 313 is provided with a cutout 314 which is intended to receive the LED board 350 and is only shown schematically in FIG. 10.

Such a cutout 314 is basically adapted to the dimensions of the LED board 350 and comprises here an insertion contour 315 (shown only schematically) and an engagement contour 316, which makes it possible to place the LED board 350 into the receptacle without causing any damage or to remove it from its receptacle in the bottom 313 of the outer ring 310.

The ring collar of the outer ring 310, or its outer wall 317, is extended outwards in a box-like manner at two points. This can be seen particularly clearly in the plan view in FIG. 12. The housings 318 for the spring-loaded locking elements 370 are accommodated in these extensions. The radial extension is necessary here in order to provide the spring travel for the spring-loaded locking elements 370. The outer ring 310 has openings 320 on its inner wall 319 in the area of the housings 318. In this embodiment, the housings 318 are closed all around and only open on the inner wall 319 towards the interior of the outer ring 310.

In the area of the opening 320, the base plate 313 of the outer ring 310 has a step or abutting edge 321. This serves to ensure that the locking element 370, which is moveably mounted in the housing 318, is not pushed completely out of the housing 318.

Finally, the inner side 319 of the outer ring 310 is slightly cut out in its contour in the area of the housing so that a slight hollow 322 is created in the inner contour which merges into the opening 320. The course of the contour line is particularly visible in the plan view in FIG. 12.

The housings 318 are arranged opposite one another. The fastening elements 370 are mounted in them. These consist of a bolt 371 and a compression spring 372. In the exemplary embodiment shown in FIG. 10, the bolt 371 is shown as a substantially cuboid-shaped element which is connected to the compression spring 372 at its end 373 facing the outer ring 310 and has a locking device 374 at its other end.

The compression spring 372 shown in FIG. 10 is a helical compression spring. It is fastened on or in the bolt 371 with its one winding end. The other free end 375 of the compression spring is directed towards the outer wall 317 of the outer ring. It is supported on the inner wall of the housing 318. The spring 372 thus always presses the bolt 371 towards the inner ring 330.

The bolt 371 has a locking device 374 which is locked on the counter-bearing of the inner ring 330. The most important surfaces of the locking device 374 are the inclined catch surface 376 and the holding surface 377 pointing in the installation direction towards the base plate 313 of the outer ring 310.

If no inner ring 330 is initially inserted, then the spring-loaded locking element 370 is seated in the housing 318 with the compression spring 371, and the bolt 371 projects in the fastening direction or in the direction of the interior of the outer ring 310. The spring 372 presses it against the abutting edge 321 provided in the bottom 313 of the outer ring 310, against which it runs with its holding surface 377 provided on the bottom side.

The inner ring 330, like the inner rings 130, 230 of the other embodiments, has a bottom side 331 and a top side 332. The bottom side 331 is aligned in the installation direction E with the base plate 313 of the outer ring 310 and is overlaid on the circuit board 350 with its LED 351 and the contact fields 352.

In this embodiment 300 too, housings for contact elements can be accommodated in the inner ring 330 or in the outer ring 310. They are not shown in more detail here.

This inner ring 330 also has a ring-shaped opening 333 in which the LED 351 is seated in a precisely fitting manner. The inner wall 334 is also funnel-shaped for the optimal beam angle.

The inner ring 330 has locking wedges 335 at two opposite locations. The outer wall 336 of the inner ring 330 is cut in a wedge shape here; the wedge tip 337 points in the direction of the outer ring 310. The outer wall 336 of the inner ring 330 forms the respective wedge on the left and right on the outer circumference limiting fitting walls 338 which are vertical to the circumferential line and extend to the wedge tip 337.

The inner ring 330 is inserted vertically into the interior of the outer ring 310 for assembly. The fitting walls 338 serve as guide elements here. The sectional view in FIG. 13 shows the surfaces that interact during installation. First of all, the lower wedge surface 339, which faces the bottom side of the inner ring 331, hits the locking bolt 371. This bottom wedge surface acts as an engagement surface 339 and pushes the bolt 371 outwards into the housing 318 against the spring force of the compression spring 372. When the bolt 371 is completely retracted, the bolt front 378 slides over the wedge tip 337. Now the inclined surface 340 of the bolt 371 pointing towards the bottom 313 of the outer ring 310—which is also referred to as the locking surface 340—engages over the upper catch surface 376 of the locking wedge 335 on the inner ring 330 pointing in the light exit direction L. The catch surface 376 and the locking surface 340 form a pair of inclined surfaces.

The pair of inclined surfaces means that the pressure forces of the spring 372, which act radially in the fastening direction B, are diverted into a holding force acting in the installation direction E. The inner ring 330 is held in the outer ring 310. The circuit board 350 is held between the inner ring 330 and the outer ring 310.

For the sake of completeness, an embodiment 400 which is almost identical to the embodiment 300 in terms of its fastening principle is shown in FIG. 14. The components already explained in relation to FIGS. 10 to 13 are also present here, only the fastening part 470 here has a leaf spring 472 rather than a spiral-shaped compression spring.

There is a ring-shaped frame 405 which consists of an outer ring 410 and an inner ring 430. Furthermore, a circuit board 450 with an LED 451 and contact fields 452 is also seated in a cutout 414 in the base 413 of the outer ring 410. It is overlaid by the inner ring 430.

The inner wall 419 of the outer ring 410 again has openings 420, identical to the embodiment 300, through which the bolt 471 fastened on the leaf spring 472 can slide in order to fasten the connection element 400 with the LED board 450 on the heat sink 500.

Here too, there are two housings 418 in the outer ring 410 which are arranged opposite one another. The housings 418 serve to receive the leaf spring 472 and are adapted to its contour. The housings 418 are formed by a cutout in the outer wall 417 of the outer ring 410 so that the leaf springs 472 can be inserted in the installation direction.

The housing 418 forms grooves 423 on the circumferential line of the outer ring 410. The free holding ends 475 of the leaf spring 472 are seated in these grooves 423. The leaf spring 472 is inserted into the housing 418 under tension, and the holding ends 475 are supported on the inner walls 424 of the grooves facing the outside of the outer ring 410.

The locking mechanism with the locking wedge 435 is identical to that of the embodiment 300. The description in respect hereof also applies to the fastening part 470.

LIST OF REFERENCE NUMERALS

100 Connection element
105 Ring-shaped frame
110 First ring/outer ring
111 Bottom side
112 Top side
113 Base plate
114 Cutout
115 Insertion contour
116 Engagement contour
117 Indentation
118 Cutout
119 Receptacle trough
120 Bore
130 Second ring/inner ring
131 Bottom side
132 Top side
133 Ring-shaped opening
134 Inner wall
135 Wall cutout
136 Outer wall

137 Holding ramp
138 Ramp tip
139 Upper surface
140 Vertical cutout wall
150 Circuit board
151 LED
152 Contact fields
170 Spring clip
171 Body extension
172 Bore hole opening
173 Holding leg
174 Contact surface
175 Spring arch
176 Spring arms
177 Holding lug
178 Holding lug tip
179 Bottom side
180 Lateral inner surfaces
181 Support sections
190 Screw bolt
191 Screw bolt head
192 Bottom side
200 Connection element
205 Ring-shaped frame
210 First ring/outer ring
211 Bottom side
212 Top side
213 Base plate
214 Cutout
215 Insertion contour
216 Engagement contour
217 Bores for screw bolts
218 Housing
219 Contour expansion
220 Opening to the inner side
221 Recess for pin
230 Second ring/inner ring
231 Bottom side
232 Top side
233 Ring-shaped opening
234 Inner wall
235 Holding lug
236 Upper surface of the holding lug
250 Circuit board
251 LED
252 Contact fields
270 Fastening part
271 Pin
272 Swivel plate
273 Guide section
274 Swivel lug
275 Receptacle profile
276 Bottom side of the swivel lug
290 Screw bolt
291 Screw bolt head
292 Bottom side
300 Connection element
305 Ring-shaped frame
310 First ring/outer ring
311 Bottom side
312 Top side
313 Base plate
314 Cutout
315 Insertion contour
316 Engagement contour
317 Outer wall of the outer ring
318 Housing

319 Inner wall of the outer ring
320 Opening to the inner side
321 Abutting edge
322 Hollow
330 Second ring/inner ring
331 Bottom side
332 Top side
333 Ring-shaped opening
334 Inner wall
335 Locking wedge
336 Outer wall of the inner ring
337 Wedge tip
338 Fitting walls
339 Engagement surface
340 Locking surface
350 Circuit board
351 LED
352 Contact fields
370 Fastening part
371 Bolt
372 Compression spring
373 Connection point
374 Locking device/locking surface
375 Free end of the compression spring
376 Catch surface
377 Holding surface
378 Bolt front
390 Screw bolt
391 Screw bolt head
392 Bottom side
400 Connection element
405 Ring-shaped frame
410 First ring/outer ring
411 Bottom side
412 Top side
413 Base plate
414 Cutout
415 Insertion contour
416 Engagement contour
417 Outer wall of the outer ring
418 Housing
419 Inner wall of the outer ring
420 Opening to the inner side
421 Abutting edge
422 Hollow
423 Groove
424 Inner wall of the groove
430 Second ring/inner ring
431 Bottom side
432 Top side
433 Ring-shaped opening
434 Inner wall
435 Locking wedge
436 Outer wall of the inner ring
437 Wedge tip
438 Fitting walls
439 Engagement surface
440 Locking surface
450 Circuit board
451 LED
452 Contact fields
470 Fastening part
471 Bolt
472 Leaf spring
473 Connection point
475 Free holding ends of the leaf spring
476 Catch surface

477 Holding surface
478 Bolt front
490 Screw bolt
491 Screw bolt head
492 Bottom side
500 Heat sink
A Arrangement plane
B Fastening direction
S System axis
E Installation direction
L Light exit direction

The invention claimed is:

1. A connection element (200) for electrically connecting an LED light source, the LED light source having a circuit board (250) with contact fields (252) for electrically supplying an LED (251), the connection element (200) comprising:

a substantially ring-shaped frame (205), the substantially ring-shaped frame (205) being configured to be overlaid on the circuit board (250) and to mechanically hold the circuit board (250) on an arrangement surface (A) of a heat sink (500); and a contact arrangement, the contact arrangement being mounted in the substantially ring-shaped frame (205) for supplying electricity to the LED (251), wherein the substantially ring-shaped frame (205) is divided into a first ring (210) and a second ring (230), wherein the first ring (210) is an outer ring configured to surround the circuit board (250) and to hold the circuit board (250) parallel to the arrangement surface (A) of the heat sink (500), wherein the second ring (230) is an inner ring seated coaxially in the outer ring (210), wherein the second ring (230) overlays the circuit board (250) at least in some areas and holds the circuit board (250) in a direction vertical to the arrangement surface (A) of the heat sink (500), wherein the connection element (200) has a fastening part (270), wherein the fastening part (270) is seated in a receptacle (218) in the outer ring (210), wherein the inner ring (230) has a counter-bearing (235) for the fastening part (270), wherein the fastening part (270) engages in the counter-bearing (235) substantially parallel to the arrangement surface (A) of the heat sink (500) and fixes the inner ring (230) in the outer ring (210), wherein the fastening part (270) comprises a swivel lug (274), and wherein the swivel lug (274) fixes the inner ring (230) in the outer ring (210).

2. The connection element (200) according to claim 1, further comprising a further swivel lug (274), wherein the swivel lug (274) and the further swivel lug (274) are arranged diametrically opposite one another and fix the inner ring (230) in the outer ring (210).

3. The connection element (200) according to claim 1, wherein the counter-bearing is formed on the inner ring (230) as a radial holding projection (235), and wherein the swivel lug (274) is overlaid on the radial holding projection (235) to fix the inner ring (230).

4. The connection element (200) according to claim 3, wherein the outer ring (210) is a receptacle for the swivel lug (274), wherein the outer ring (210) forms a housing (218), wherein the swivel lug (274) is seated by a pin (271) in the housing (218), wherein the pin (271) is vertical to the arrangement surface (A), and wherein the swivel lug (274) is capable of pivoting around a longitudinal axis of the pin (271) out of the housing (218) onto the radial holding projection (235).

5. The connection element (200) according to claim 1, wherein the swivel lug (274) has a receptacle profile (275) for an unlocking tool.

6. The connection element (200) according to claim 1, wherein the outer ring (210) forms a contour cutout (219) in a region of the swivel lug (274) for inserting an associated holding projection (235).

7. A connection element (100) electrically connecting an LED light source, the LED light source having a circuit board (150) with contact fields (152) for electrically supplying an LED (151), the connection element (100) comprising:

a substantially ring-shaped frame (105), the substantially ring-shaped frame (105) being configured to be overlaid on the circuit board (150) and to mechanically hold the circuit board (150) on an arrangement surface (A) of a heat sink (500); and a contact arrangement, the contact arrangement being mounted in the substantially ring-shaped frame (105) for supplying electricity to the LED (151), wherein the substantially ring-shaped frame (105) is divided into a first ring (110) and a second ring (130), wherein the first ring (110) is an outer ring configured to surround the circuit board (150) and to hold the circuit board (150) parallel to the arrangement surface (A) of the heat sink (500), wherein the second ring (130) is an inner ring seated coaxially in the outer ring (110), wherein the second ring (130) overlays the circuit board (150) at least in some areas and holds the circuit board (150) in a direction vertical to the arrangement surface (A) of the heat sink (500), wherein the connection element (100) has a fastening part (170), wherein the fastening part (170) is seated in a receptacle (119) in the outer ring (110), wherein the inner ring (130) has a counter-bearing (135) for the fastening part (170), wherein the fastening part (170) engages in the counter-bearing (135) substantially parallel to the arrangement surface (A) of the heat sink (500) and fixes the inner ring (130) in the outer ring (110), wherein the fastening part is a spring clip (170) with a holding leg (173), wherein an outer wall (136) of the inner ring (130) rests against the holding leg (173), wherein the fastening part has two spring arms (176) extending from the holding leg (173) in opposite circumferential directions, and wherein the two spring arms (176) engage around the inner ring (130) and fix the inner ring (130) in the outer ring (110).

8. The connection element (100) according to claim 7, further comprising a further spring clip (170), wherein the spring clip (170) and the further spring clip (170) are arranged diametrically opposite one another and fix the inner ring (130) in the outer ring (110).

9. The connection element (100) according to claim 7, wherein each of the two spring arms (176) has, at a free end, a holding lug (177) pointing towards the inner ring (130), wherein the inner ring (130) is provided with wall cutouts (135), and wherein each holding lug (177) engages over a holding surface (137) in the wall cutout (135) and thereby exerts an additional holding force on the inner ring (130) acting towards the arrangement surface (A).

10. The connection element (100) according to claim 9, wherein the spring arms (176) each have at their free end a support section (181) vertical to the holding leg (173), wherein the support sections (181) are seated on a bottom (113) of the outer ring (110), and wherein the support sections (181) of a spring clip (170) engage around the two corresponding wall cutouts (135) of the inner ring (130).

11. The connection element (100) according to claim 7, wherein the receptacle for the spring clip (170) is formed as a trough (119) in a bottom (113) of the outer ring (110).

12. The connection element (100) according to claim 7, wherein, starting from the holding leg (173), the spring clip (170) forms a body extension (171), wherein an upper surface of the body extension (171) serves as a support for an arrangement means (190) for fastening the connection element (100) on the heat sink (500), and wherein the body extension (171) has an opening (172) arranged congruently with a bore (120) in the outer ring (110) to guide the arrangement means (190) therethrough.

13. A connection element (300, 400) for electrically connecting an LED light source, the LED light source having a circuit board (350, 450) with contact fields (352, 452) for electrically supplying an LED (351, 451), the connection element (300, 400) comprising:

a substantially ring-shaped frame (305, 405), the substantially ring-shaped frame (305, 405) being configured to overlay the circuit board (350, 450) and to mechanically hold the circuit board (350, 450) on an arrangement surface (A) of a heat sink (500); and a contact arrangement, the contact arrangement being mounted in the substantially ring-shaped frame (305, 405) for supplying electricity to the LED (351, 451), wherein the substantially ring-shaped frame (305, 405) is divided into a first ring (310, 410) and a second ring (330, 430), wherein the first ring (310, 410) is an outer ring configured to surround the circuit board (350, 450) and to hold the circuit board (350, 450) parallel to the arrangement surface (A) of the heat sink (500), wherein the second ring (330, 430) is an inner ring seated coaxially in the outer ring (310, 430), wherein the second ring (330, 430) overlays the circuit board (350, 450) at least in some areas and holds the circuit board (350, 450) in a direction vertical to the arrangement surface (A) of the heat sink (500), wherein the connection element (300, 400) has a fastening part (370, 470), wherein the fastening part (370, 470) is seated in a receptacle (318, 418) in the outer ring (310, 410), wherein the inner ring (330, 430) has a counter-bearing (335, 435) for the fastening part (370, 470), wherein the fastening part (370, 470) engages in the counter-bearing (335, 435) substantially parallel to the arrangement surface (A) of the heat sink (500) and fixes the inner ring (330, 430) in the outer ring (410), wherein the fastening part (370, 470) comprises a spring-loaded locking element (370, 470), and wherein the spring-loaded locking element (370, 470) fixes the inner ring (330, 430) in the outer ring (310, 410).

14. The connection element (300, 400) according to claim 13, further comprising a further spring-loaded locking element (370, 470), wherein the spring-loaded locking element (370, 470) and the further spring-loaded locking element (370, 470) are arranged diametrically opposite one another and fix the inner ring (330, 430) in the outer ring (310, 410).

15. The connection element (300, 400) according to claim 13, wherein the outer ring (310, 410) forms the receptacle for the spring-loaded locking element (370, 470) in the form of a housing (318, 418) that is open towards the inner ring (330, 430), and wherein the locking element (370, 470) is seated in the housing (318, 418) so as to be radially moveable.

16. The connection element (300, 400) according to claim 15, wherein the locking element (370, 470) comprises a bolt (371, 471) and a compression spring (372, 472), wherein the compression spring (372, 472) is seated in the housing (318, 418) and presses the bolt (371, 471) in a radial direction towards the inner ring (330, 430).

17. The connection element (300, 400) according to claim 16, wherein the inner ring (330, 430) forms a locking wedge (335, 435), wherein the locking wedge (335, 435) cooperates with the bolt (371, 471), and wherein a lower wedge surface (339, 439) of the locking wedge (335, 435) serves as an engagement surface.

18. The connection element (300, 400) according to claim 17, wherein an upper wedge surface (340, 440) of the locking wedge (335, 435) serves as a locking surface, wherein the locking surface cooperates with a catch surface (376, 476) on an underside of the bolt (371, 471) and fixes the inner ring (330, 430) in the outer ring (310, 410).

19. The connection element (300, 400) according to claim 18, wherein the locking surface (340, 440) and the catch surface (376, 476) form a pair of inclined surfaces, and wherein the pair of inclined surfaces deflects radially acting forces of the compression spring (372, 472) towards the arrangement surface (A).

20. The connection element (300, 400) according to claim 16, wherein the compression spring (372, 472) of the spring-loaded locking element (370, 470) is a helical spring (372) or a leaf spring (472).

* * * * *